(12) United States Patent
Matsubara et al.

(10) Patent No.: US 7,091,824 B2
(45) Date of Patent: Aug. 15, 2006

(54) REMOTE STARTING CONTROL APPARATUS AND STARTING CONTROL APPARATUS

(75) Inventors: Manabu Matsubara, Hyogo (JP); Minoru Yoshimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 329 days.

(21) Appl. No.: 10/740,499

(22) Filed: Dec. 22, 2003

(65) Prior Publication Data

US 2005/0073197 A1    Apr. 7, 2005

(30) Foreign Application Priority Data

Dec. 24, 2002  (JP) .............................. 2002-372481

(51) Int. Cl.
   *B60R 25/00* (2006.01)
   *B60R 25/04* (2006.01)
(52) U.S. Cl. .................. 340/5.72; 307/10.5; 701/2; 180/287
(58) Field of Classification Search ............... 340/5.72, 340/5.1; 307/10.5
   See application file for complete search history.

(56) References Cited

U.S. PATENT DOCUMENTS 5,612,578 A * 3/1997 Drew ..................... 307/10.5
5,650,774 A * 7/1997 Drori ......................... 340/5.72
5,818,330 A * 10/1998 Schweiger ................... 307/10.5
5,912,512 A * 6/1999 Hayashi et al. ............ 340/5.72
5,933,090 A * 8/1999 Christenson ............ 340/825.69
5,937,065 A * 8/1999 Simon et al. ............... 380/262
5,995,013 A * 11/1999 Yoshizawa et al. .... 340/825.69
6,700,220 B1 * 3/2004 Bayeur et al. .............. 307/10.2

FOREIGN PATENT DOCUMENTS

JP       A 10-176642       6/1998

* cited by examiner

*Primary Examiner*—Wendy R. Garber
*Assistant Examiner*—Clara Yang
(74) *Attorney, Agent, or Firm*—Oliff & Berridge, PLC

(57) ABSTRACT

A remote starting control apparatus is installed in a vehicle incorporating an immobilizer section for inputting a key code output based on insertion of an ignition key into a key cylinder, and when determining that the input key code is a predetermined key code, enabling an engine to be started. The remote starting control apparatus performs starting control of the engine in response to an instruction from a portable transmitter. It includes comparing two or more key codes output from an immobi amplifier in response to two or more key code output requests, thereby determining the key code to be stored in EEPROM from among the key codes, storing the determined key code in the EEPROM, and supplying the key code stored in the EEPROM to the immobilizer section upon reception or a start command of the engine by remote operation.

19 Claims, 19 Drawing Sheets

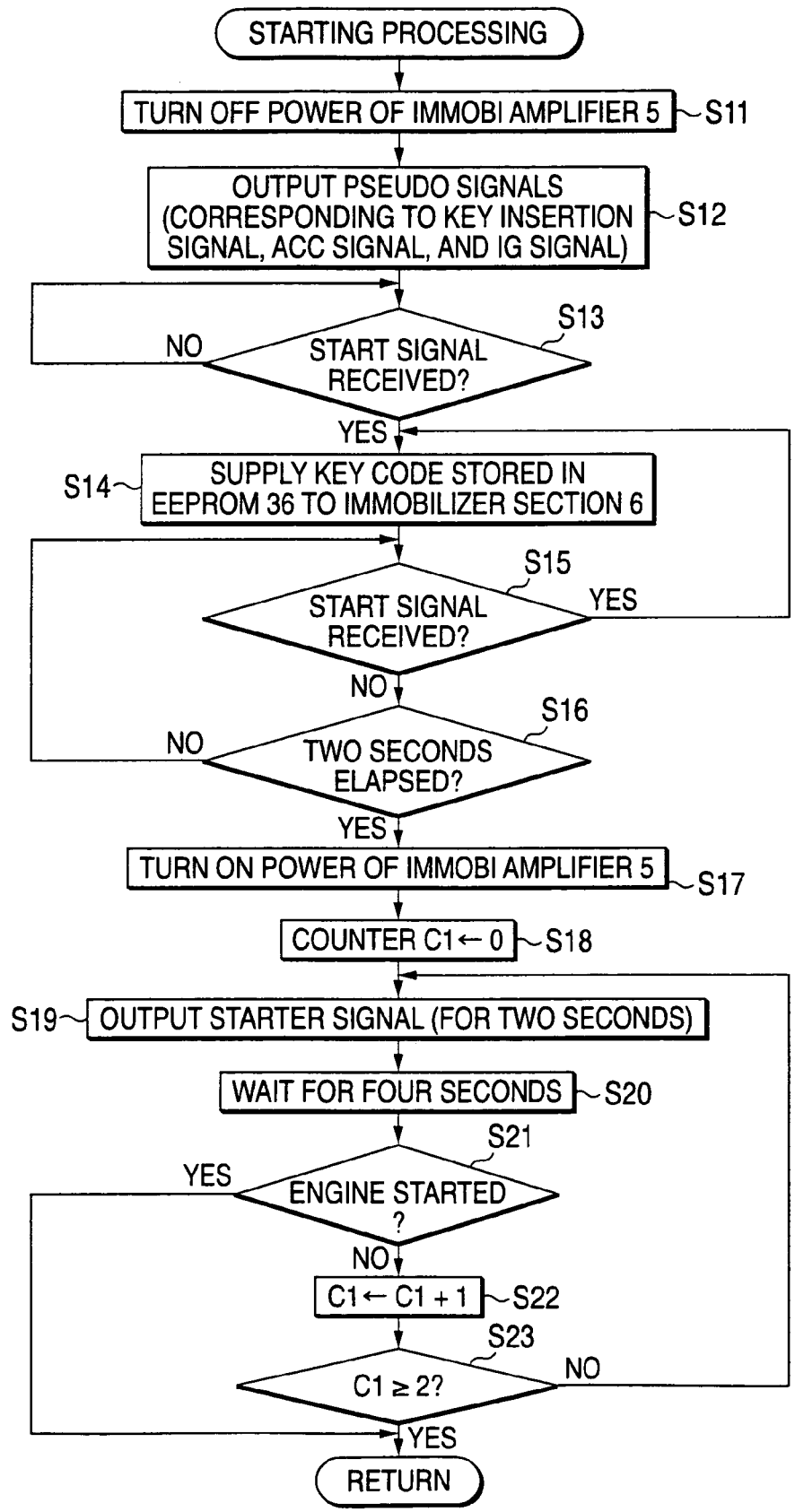

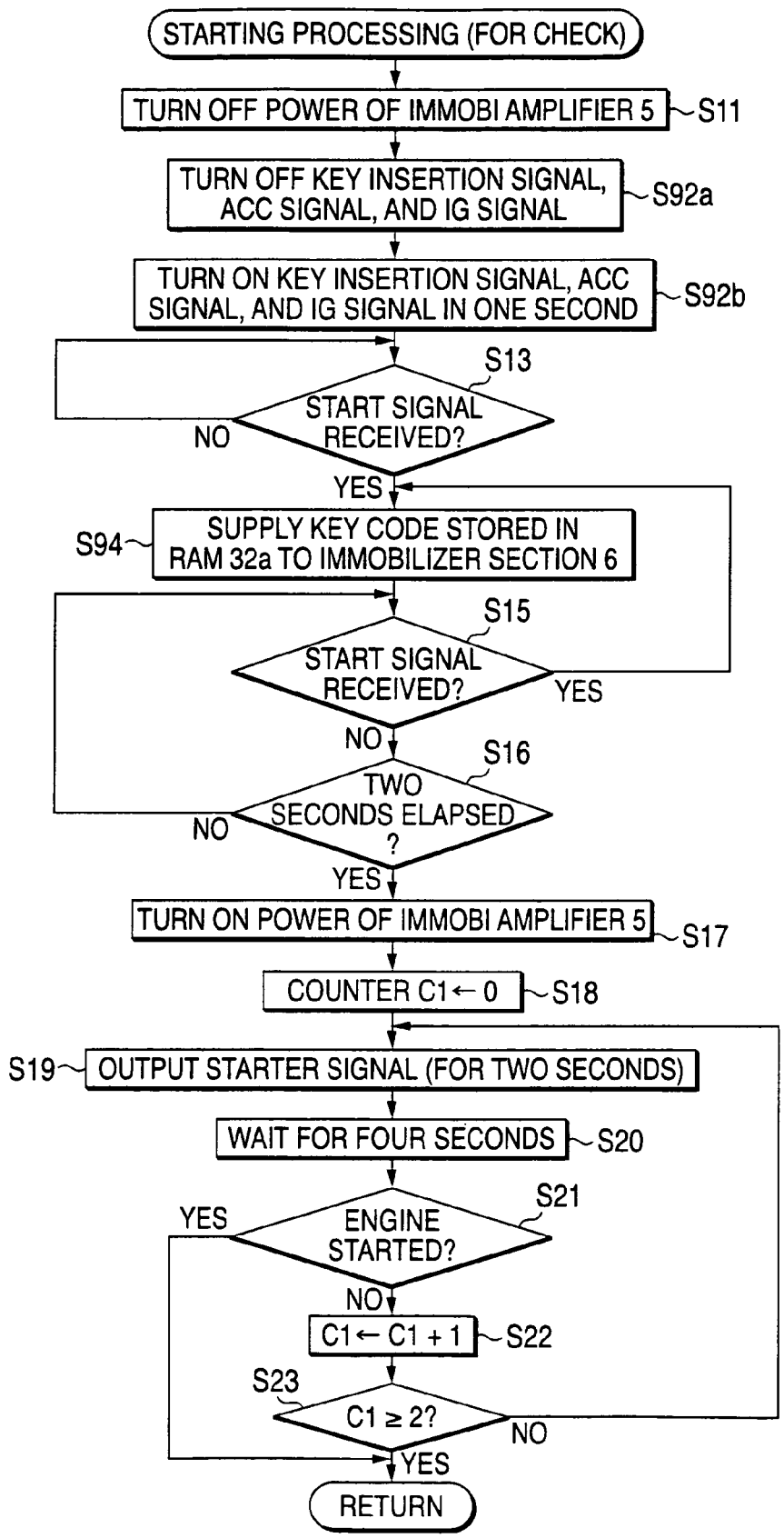

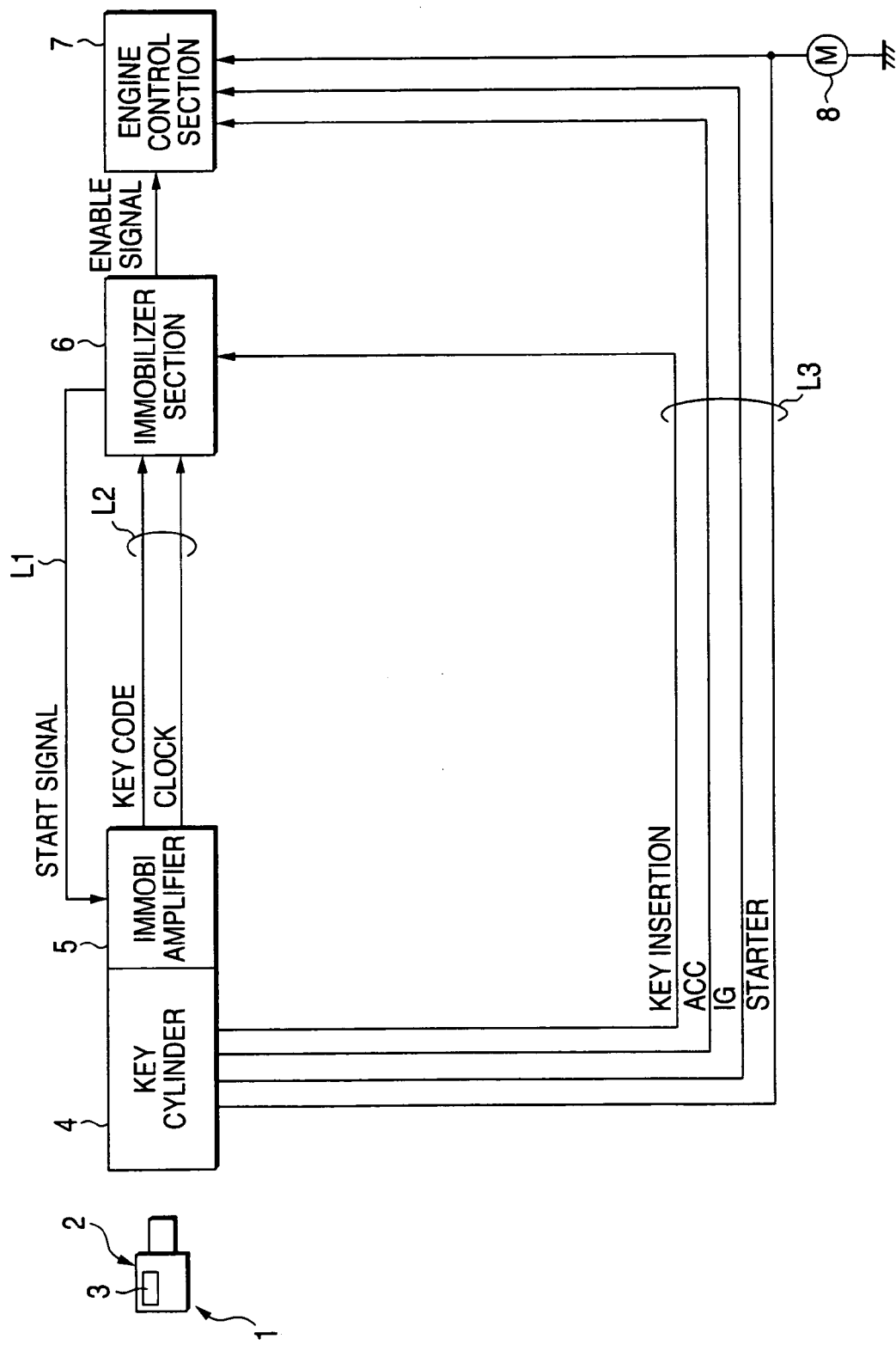

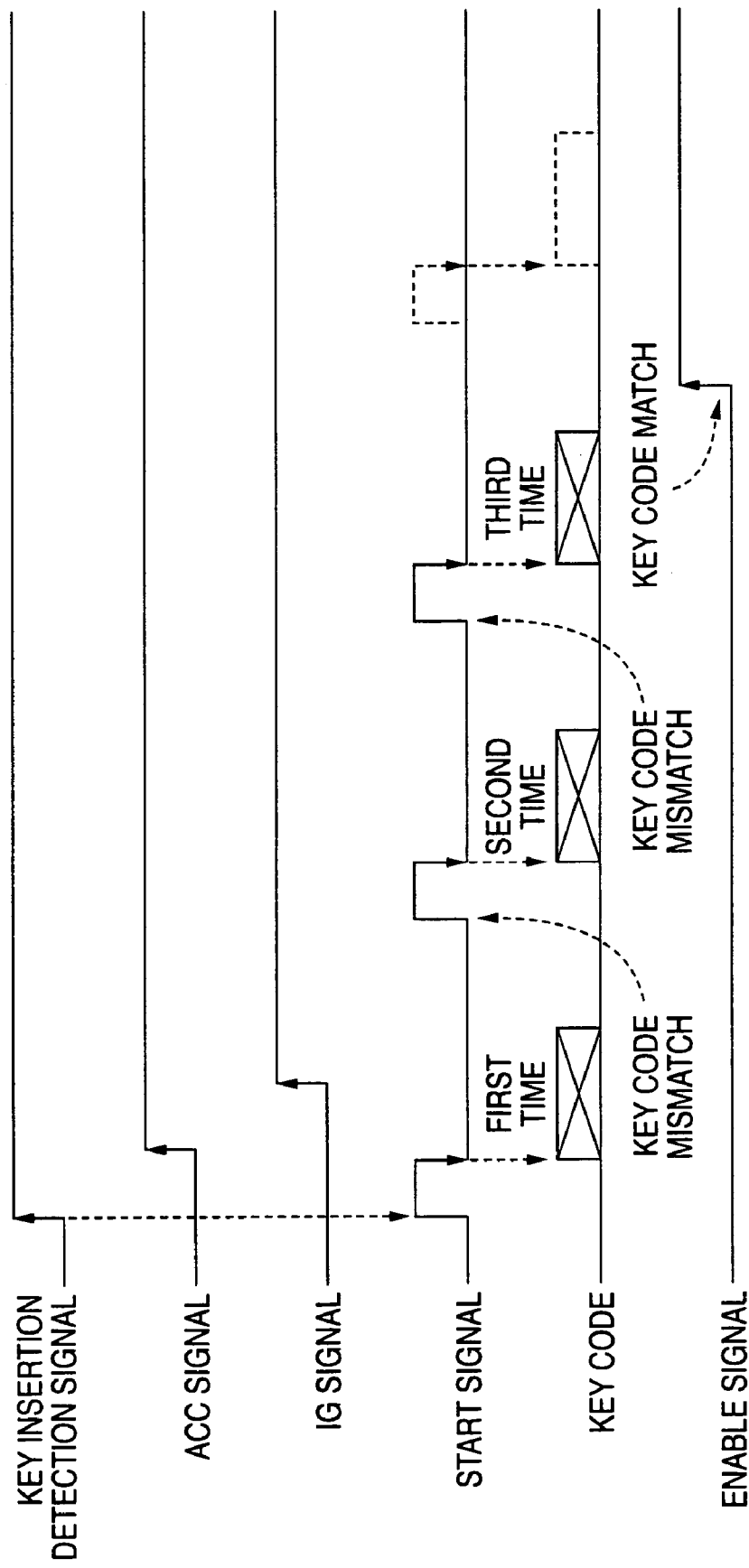

REMOTE STARTING CONTROL APPARATUS AND STARTING CONTROL APPARATUS

BACKGROUND OF THE INVENTION

1. Field of the Invention

This invention relates to a remote starting control apparatus and a starting control apparatus and more particularly to a remote starting control apparatus to be installed in a vehicle having an immobilizer function and a starting control apparatus having an immobilizer function.

2. Description of the Related Art

Recently, vehicles including a theft prevention function called an immobilizer have been growing in number. To provide the immobilizer function (for an engine), an ignition key 1 having a transponder 3 storing a specific key code and having a transmission function, contained in a grip section 2, a key cylinder 4, an immobi amplifier 5 attached to the key cylinder 4 for extracting the key code from the ignition key 1, an immobilizer section 6 storing the specific key code and having a theft prevention function, and an engine control section 7 for performing control of engine starting, etc., are required as shown in FIG. 13.

When a driver inserts the ignition key 1 into the key cylinder 4, a key insertion signal goes high and the immobilizer section 6 receiving the high signal transmits a pulse-like start signal to the immobi amplifier 5 via a signal line L1. FIG. 14 is a timing chart from the instant at which the ignition key 1 is inserted into the key cylinder 4 to the instant at which an enable signal is output to the engine control section 7.

The immobilizer section 6 may transmit the start signal upon reception of an ACC signal which goes high when the ignition key 1 is turned to an ACC output position or an IG signal which goes high when the ignition key 1 is turned to an IG output position rather than upon reception of the key insertion signal (high).

Upon reception of the start signal, the immobi amplifier 5 supplies power by electromagnetic induction and starts the transponder 3 of the ignition key 1 inserted in the key cylinder 4, thereby extracting the key code (unique to the ignition key 1) stored in the transponder 3, and outputs the extracted key code together with a clock signal to the immobilizer section 6 via a signal line L2.

The immobilizer section 6 determines whether or not the key code (unique to the ignition key 1) sent from the immobi amplifier 5 matches the key code stored in the immobilizer section 6 (key code collation). If the immobilizer section 6 determines that the key codes match, the immobilizer section 6 regards the driver inserting the ignition key 1 into the key cylinder 4 as the authorized driver, and gives an enable signal for enabling the engine to be started to the engine control section 7. If the key code sent from the immobi amplifier 5 does not match the key code stored in the immobilizer section 6, the start signal is again transmitted to the immobi amplifier 5 (repeated at a maximum of about 100 times every about 100 milliseconds).

Upon reception of a starter signal output from the key cylinder 4 after reception of the enable signal, the engine control section 7 performs starting control of a starter motor; in contrast, if the engine control section 7 receives the starter signal with the enable signal not received, the engine control section 7 does not perform starting control of the starter motor.

Thus, if the key code stored in the transponder 3 of the ignition key 1 does not match the key code stored in the immobilizer section 6, the engine cannot be started. Thus, if an unauthorized ignition key or ignition switch is directly connected, the engine cannot be started and vehicle theft can be prevented.

On the other hand, a remote starting control apparatus for starting an engine by remote operation is commercially practical. As shown in FIG. 15, upon reception of an engine start instruction signal from a portable transmitter 19 carried by a driver, a remote starting control apparatus 18 supplies pseudo signals corresponding to an ACC signal, an IG signal, and a starter signal output when an authorized ignition key 11 is turned to a starter output position to a signal line L3 of ignition switch and transmits the pseudo signals to an engine control section 17.

Accordingly, if the driver does not insert the ignition key 11 into the key cylinder 14 and not turn the ignition key 11, the engine can be started simply by transmitting the engine start instruction signal from the portable transmitter 19.

However, to add the remote starting control apparatus 18 to a vehicle having the immobilizer function as shown in FIG. 13, the key code stored in the transponder 3 of the ignition key 1 needs to match the key code stored in the immobilizer section 6, namely, the authorized ignition key 1 needs to be inserted into the key cylinder 4. Thus, if the pseudo signals (pseudo signals of ACC signal, IG signal, and starter signal) are given to the engine control section 7, the engine cannot be started; this is a problem.

To solve such a problem, the following invention is disclosed: The key code matching the key code stored in the immobilizer section 6 is registered in the remote starting control apparatus 18. Upon reception of an engine starting instruction by remote operation, the key code is transmitted from the remote starting control apparatus 18 to the immobilizer section 6 and the enable signal is sent from the immobilizer section 6 to the engine control section 7. (For example, refer to JP-A-10-176642.)

In the invention described in patent document 1, mode switching (switching from the usual operation mode to a program mode for registering a key code) is performed. When the program mode is set, if the key code unique to the ignition key is output from the immobi amplifier, the output key code is input and registered.

However, when the key code output from the immobi amplifier is input, the key code may be unable to be normally input and unable to be normally registered because of reception of the effect of noise, etc. If the key code is not normally registered, it becomes impossible to start the engine by remote operation, of course.

To check whether or not the key code is normally registered, the mode may be switched from the program mode to the usual operation mode and remote operation may be actually performed. However, the check work is very burdensome. If the key code is not normally registered (namely, the engine cannot be started by remote operation), it is necessary to again switch the mode and again perform registration work from the beginning.

By the way, some immobilizer sections enable a plurality of key codes to be registered. For example, not only the key code set in the master key of the ignition key, but also the key code set in a subkey can be registered. Usually, the key code set in the master key is registered in the immobilizer section by the manufacturer, a dealer, etc., and the key code set in the subkey is registered by the user.

Thus, the key code is registered not only in the remote starting control apparatus, but also in the immobilizer section. Of course, to register the key code in the immobilizer section, still the key code may not be normally registered because of reception of the effect of noise, etc.

If a plurality of key codes can be registered in the immobilizer section, it is also made possible to previously register the key code unique to the remote starting control apparatus in the remote starting control apparatus and later register the key code in the immobilizer section. This eliminates the need for registering the key code unique to the ignition key in the remote starting control apparatus as in the invention described in patent document 1; instead, it becomes necessary to register the key code unique to the remote starting control apparatus in the immobilizer section. Therefore, the key code may not be normally registered in the immobilizer section because of reception of the effect of noise, etc., as mentioned above.

SUMMARY OF THE INVENTION

It is therefore an object of the invention to provide a remote starting control apparatus for making it possible to register a key code with good accuracy and simplify key code registration and checking, and a starting control apparatus having an immobilizer function.

To the end, according to the invention, there is provided a remote starting control apparatus (1) being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, including a first storage unit for storing a key code; a supply unit for supplying the key code stored in the first storage unit to the starting control apparatus upon reception of a starting command of the engine by remote operation; a first acquisition unit for acquiring the key code output from the key code output unit in response to a key code output request; a first determination unit for comparing two or more key codes output from the key code output unit in response to two or more key code output requests, acquired by the first acquisition unit, thereby determining the key code to be stored in the first storage unit from among the key codes; and a first storage control unit for storing the key code determined by the first determination unit in the first storage unit.

According to the remote starting control apparatus (1), upon reception of a starting command of the engine, etc., by remote operation, the key code stored in the first storage unit is supplied to the starting control apparatus (immobilizer section). Thus, if the key code matching the predetermined key code is stored in the first storage unit, when a starting command of the engine by remote operation is received, the key code matching the predetermined key code is supplied to the starting control apparatus, which then enables the engine to be started as if the authorized ignition key were inserted into the key cylinder.

Accordingly, if the authorized ignition key is not inserted into the key cylinder and not turned, the engine can be started by remote operation. As the engine, an engine of an internal combustion engine automobile, a power generator such as a motor of an electric automobile, or the like can be named.

By the way, as described in [Problems to be Solved by the Invention], when the key code output from the key code output unit (immobi amplifier) is input, the key code may be unable to be normally input and unable to be normally registered in the remote starting control apparatus because of reception of the effect of noise, etc.

If one key code cd1 receives the effect of noise, it may change to a completely different key code cdx or cdy. Since change in the key code caused by the effect of noise is not regular, even if the original is the same key code cd1, the key codes cdx and cdy after the original changes become completely different key codes.

Therefore, if the two key codes output from the key code output unit in response to two key code output requests become the same, it cannot be considered at all that the key codes receive the effect of noise. Thus, it can be determined that the key codes can be normally input without receiving the effect of noise, etc.

For example, if the same key code is acquired two successive times or if the same key code is acquired twice or more unsuccessively, it can be determined that the key code can be normally input without receiving the effect of noise, etc.

According to the remote starting control apparatus (1), two or more key codes output from the key code output unit in response to two or more key code output requests are compared, thereby determining the key code to be stored in the first storage unit from among the key codes. Therefore, the key code that can be normally input without receiving the effect of noise, etc., is adopted as the key code to be stored in the first storage unit, so that the key code can be registered with good accuracy.

As remote starting control apparatus (2) according to the invention, in the remote starting control apparatus (1), the first determination unit uses any of the key codes acquired by the first acquisition unit as the reference and determines whether or not the reference key code matches a different key code acquired by the first acquisition unit and if the reference key code matches the different key code, determines that either of the key codes is the key code to be stored in the first storage unit.

According to the remote starting control apparatus (2), if it is determined that the reference key code matches the different key code (acquisition of the same key code), either of the key codes is determined to be the key code to be stored in the first storage unit, so that the key code can be registered with good accuracy.

As remote starting control apparatus (3) according to the invention, the remote starting control apparatus (1) or (2) further includes a first request unit for sending a key code output request to the key code output unit, wherein the key code output from the key code output unit in response to the key code output request made by the first request unit and acquired by the first acquisition unit is contained in the key code to be compared.

As described in [Related arts], when the ignition key 1 is inserted into the key cylinder 4 (predetermined operation), the immobilizer section 6 (starting control apparatus) receiving the signal indicating the ignition key 1 is inserted transmits a start signal to the immobi amplifier 5 (key code output unit). Upon reception of the start signal, the immobi amplifier 5 extracts the key code unique to the ignition key 1 and outputs the extracted ignition key 1 to the immobilizer section 6. If the key code does not match the key code stored in the immobilizer section 6, the immobilizer section 6 again transmits a start signal to the immobi amplifier 5. This processing is repeated until the key codes match (at a maximum of about 100 times).

Therefore, in the processing sequence, of the key codes output from the immobi amplifier 5, the key code to be stored in the first storage unit becomes only the key code output upon reception of the last start signal transmitted from the immobilizer section 6. This key code corresponds to the third key code shown in FIG. 14.

In this connection, the key code output from the immobi amplifier 5 upon reception of any other than the last start signal is a key code not matching the key code stored in the immobilizer section 6 and is not the key code to be stored in the first storage unit. The key code corresponds to the first or second key code shown in FIG. 14. Thus, in the manner in the related art, only one key code to be stored in the first storage unit (namely, key code to be compared) can be acquired.

According to the remote starting control apparatus (3), a key code output request is sent to the key code output unit (immobi amplifier). Therefore, a key code output request which would be made only in the starting control apparatus (immobilizer section) in the related art is also made in the remote starting control apparatus in the invention, so that two or more key codes to be compared can be acquired.

As remote starting control apparatus (4) according to the invention, the remote starting control apparatus (3) further includes a requirement determination unit for determining whether or not the $(n_1+1)$st key code to be compared needs to be acquired after the $n_1$ ($\geq 2$)th key code to be compared is acquired by the first acquisition unit; and a first execution control unit for causing a first request unit to make a key code output request if the requirement determination unit determines that the $(n_1+1)$st key code to be compared needs to be acquired.

To determine the key code to be stored in the first storage unit, two or more key codes to be compared need to be acquired; however, if the key code to be stored in the first storage unit is determined, a key code need not be acquired any more.

According to the remote starting control apparatus (4), whether or not the $(n_1+1)$st key code to be compared needs to be acquired is determined after the $n_1$ ($\geq 2$)th key code to be compared is acquired, and if it is determined that the $(n_1+1)$st key code to be compared needs to be acquired, a key code output request is made. Accordingly, a key code output request can be prevented from being made more than necessary.

As the criterion as to whether or not the $(n_1+1)$st key code to be compared needs to be acquired, the case where the first to $n_1$th key codes acquired so far include the same key codes, the case where the $(n_1-1)$st key code and the $n_1$th key code are the same, or the like can be named.

As remote starting control apparatus (5) according to the invention, the remote starting control apparatus (3) or (4) further includes an input determination unit for determining whether or not the key code matching the predetermined key code is input in the starting control apparatus, wherein the key code output from the key code output unit in response to the key code output request made by the starting control apparatus based on the predetermined operation and acquired by the first acquisition unit is contained in the key code to be compared.

As described above, when the ignition key 1 is inserted into the key cylinder 4 (predetermined operation), the immobilizer section 6 (starting control apparatus) receiving the signal indicating the ignition key 1 is inserted transmits a start signal to the immobi amplifier 5 (key code output unit). Upon reception of the start signal, the immobi amplifier 5 extracts the key code unique to the ignition key 1 and outputs the extracted ignition key 1 to the immobilizer section 6. If the key code does not match the key code stored in the immobilizer section 6, the immobilizer section 6 again transmits a start signal to the immobi amplifier 5. This processing is repeated until the key codes match (at a maximum of about 100 times every about 100 milliseconds).

Therefore, as the last start signal transmitted from the immobilizer section 6 is received, the key code output from the immobi amplifier 5 matches the key code stored in the immobilizer section 6 (predetermined key code). The key code corresponds to the third key code shown in FIG. 14.

In other words, as the last start signal transmitted from the immobilizer section 6 is received, the key code output from the immobi amplifier 5 is normally input into the immobilizer section 6 without receiving the effect of noise, etc. The fact that the key code output from the immobi amplifier 5 is normally input into the immobilizer section 6 does not necessarily mean that the key code is also normally input into the remote starting control apparatus; however, it is conceivable that the possibility that the key code may be normally input may be high as compared with any other case.

According to the remote starting control apparatus (5), the key code output from the key code output unit (immobi amplifier) in response to the key code output request made by the starting control apparatus (immobilizer section) based on the predetermined operation and acquired by the first acquisition unit is contained in the key code to be compared.

Since the remote starting control apparatus further includes the input determination unit for determining whether or not the key code matching the predetermined key code is input in the starting control apparatus, which of the key codes output from the key code output unit (immobi amplifier) is normally input into the starting control apparatus (immobilizer section) (without receiving the effect of noise, etc.,) can be determined.

Accordingly, the key code having a low possibility that it may receive the effect of noise, etc., can be contained in the key codes to be stored in the first storage unit (namely, the key codes to be compared), so that the key code can be registered efficiently.

To determine whether or not the key code matching the predetermined key code is input in the starting control apparatus, whether or not a time of about 500 milliseconds has elapsed since no start signal was transmitted from the starting control apparatus may be determined, because start signal transmission processing is repeated every about 100 milliseconds until the key code matching the predetermined key code is input and thus a time interval of 500 milliseconds (100 milliseconds plus α) or more means that the key code matching the predetermined key code has been input.

As remote starting control apparatus (6) according to the invention, the remote starting control apparatus (5) further includes a second execution control unit for causing a first request unit to make a key code output request if the input determination unit determines that the key code matching the predetermined key code is input in the starting control apparatus.

According to the remote starting control apparatus (6), if the input determination unit determines that the key code matching the predetermined key code is input in the starting control apparatus (immobilizer section), the first request unit makes a key code output request, so that a key code output request can be made at an appropriate timing.

As remote starting control apparatus (7) according to the invention, the remote starting control apparatus (1) or (2) further includes a pseudo state producing unit for artificially producing a state in which the predetermined operation is performed, wherein as the pseudo state producing unit artificially produces the state in which the predetermined operation is performed and the starting control apparatus sends a key code output request to the key code output unit, the key code output from the key code output unit and acquired by the first acquisition unit is contained in the key code to be compared.

According to the remote starting control apparatus (7), the state in which the predetermined operation (for example, insertion of the ignition key into the key cylinder) is performed is artificially produced. If the state in which the predetermined operation is performed is produced even if it is artificially produced, the starting control apparatus (immobilizer section) sends a key code output request to the key code output unit (immobi amplifier), which then outputs the key code.

Accordingly, although the remote starting control apparatus (3) to (6) directly makes a key code output request, the remote starting control apparatus (7) makes it possible to acquire two or more key codes to be compared if the remote starting control apparatus (7) does not make a key code output request.

As remote starting control apparatus (8) according to the invention, the remote starting control apparatus (7) further includes a requirement determination unit for determining whether or not the $(n_1+1)$st key code to be compared needs to be acquired after the $n_1$ ($\geqq 2$)th key code to be compared is acquired by the first acquisition unit; and a third execution control unit for causing the pseudo state producing unit to perform processing if the requirement determination unit determines that the $(n_1+1)$st key code to be compared needs to be acquired.

To determine the key code to be stored in the first storage unit, two or more key codes to be compared need to be acquired; however, if the key code to be stored in the first storage unit is determined, a key code need not be acquired any more.

According to the remote starting control apparatus (8), whether or not the $(n_1+1)$st key code to be compared needs to be acquired is determined after the $n_1$ ($\geqq 2$)th key code to be compared is acquired, and if it is determined that the $(n_1+1)$st key code to be compared needs to be acquired, the state in which the predetermined operation is performed is artificially produced. Accordingly, a key code output request can be prevented from being made more than necessary.

As the criterion as to whether or not the $(n_1+1)$st key code to be compared needs to be acquired, the case where the first to $n_1$th key codes acquired so far include the same key codes, the case where the $(n_1-1)$st key code and the $n_1$th key code are the same, or the like can be named.

As remote starting control apparatus (9) according to the invention, the remote starting control apparatus (7) or (8) further includes an input determination unit for determining whether or not the key code matching the predetermined key code is input in the starting control apparatus, wherein the key code output from the key code output unit in response to the key code output request made by the starting control apparatus based on the predetermined operation and acquired by the first acquisition unit is contained in the key code to be compared.

According to the remote starting control apparatus (9), the key code output from the key code output unit (immobi amplifier) in response to the key code output request made by the starting control apparatus (immobilizer section) based on the predetermined operation and acquired by the first acquisition unit is contained in the key code to be compared.

Since the remote starting control apparatus further includes the input determination unit for determining whether or not the key code matching the predetermined key code is input in the starting control apparatus, which of the key codes output from the key code output unit is normally input into the starting control apparatus (without receiving the effect of noise, etc.,) can be determined.

Accordingly, the key code having a low possibility that it may receive the effect of noise, etc., can be contained in the key codes to be stored in the first storage unit (namely, the key codes to be compared), so that the key code can be registered efficiently.

As remote starting control apparatus (10) according to the invention, the remote starting control apparatus (9) further includes a fourth execution control unit for causing the pseudo state producing unit to perform processing if the input determination unit determines that the key code matching the predetermined key code is input in the starting control apparatus.

According to the remote starting control apparatus (10), if the input determination unit determines that the key code matching the predetermined key code is input in the starting control apparatus (immobilizer section), the pseudo state producing unit produces the state in which the predetermined operation is performed, and the starting control apparatus makes a key code output request, so that a key code output request can be made at an appropriate timing.

As remote starting control apparatus (11) according to the invention, any of the remote starting control apparatus (1) to (10) further includes an informing unit, upon completion of storing the key code determined by the first determination unit in the first storage unit, for informing the user that the key code has been stored in the first storage unit.

According to the remote starting control apparatus (11), upon completion of storing the key code determined by the first determination unit in the first storage unit, the user is informed that the key code has been stored in the first storage unit, so that the user can easily keep track of completion of precise registration of the key code.

According to the invention, there is provided a remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, including a first storage unit for storing a key code; a supply unit for supplying the key code stored in the first storage unit to the starting control apparatus upon reception of a starting command of the engine by remote operation; a second determination unit for determining the key code to be stored in the first storage unit from among the key codes provided by the key code output unit; and a check unit for supplying the key code determined by the second determination unit to the starting control apparatus, thereby checking whether or not the key code is the key code to be stored in the first storage unit.

According to the remote starting control apparatus (12), upon reception of a starting command of the engine, etc., by remote operation, the key code stored in the first storage unit is supplied to the starting control apparatus (immobilizer section). Thus, if the key code matching the predetermined key code is stored in the first storage unit, when a starting command of the engine by remote operation is received, the key code matching the predetermined key code is supplied to the starting control apparatus, which then enables the engine to be started as if the authorized ignition key were inserted into the key cylinder.

Accordingly, if the authorized ignition key is not inserted into the key cylinder and not turned, the engine can be started by remote operation. As the engine, an engine of an internal combustion engine automobile, a power generator such as a motor of an electric automobile, or the like can be named.

By the way, as described in [Problems to be Solved by the Invention], when the key code output from the key code output unit (immobi amplifier) is input, the key code may be unable to be normally input and unable to be normally registered because of reception of the effect of noise, etc.

According to the remote starting control apparatus (12), the key code determined (to be the key code to be stored in the first storage unit) by the second determination unit is supplied to the starting control apparatus (immobilizer section), whereby whether or not the key code is the key code to be stored in the first storage unit can be checked.

When the appropriate key code to be stored in the first storage unit (namely, the key code matching the predetermined key code) is supplied to the starting control apparatus, the starting control apparatus outputs an enable signal for enabling the engine to be started. In other words, if the key code not to be stored in the first storage unit is supplied to the starting control apparatus, the enable signal is not output.

Therefore, according to the remote starting control apparatus (12), for example, whether or not the enable signal is output from the starting control apparatus is determined, whereby whether or not the key code determined by the second determination unit is the key code to be stored in the first storage unit can be checked.

As remote starting control apparatus (13) according to the invention, in the remote starting control apparatus (12), the check unit supplies the key code determined by the second determination unit to the starting control apparatus and also issues a command to the engine, thereby checking whether or not the key code is the key code to be stored in the first storage unit.

According to the remote starting control apparatus (13), the key code determined (to be the key code to be stored in the first storage unit) by the second determination unit is supplied to the starting control apparatus (immobilizer section) and a command to start the engine is issued, whereby whether or not the key code is the key code to be stored in the first storage unit can be checked.

When the appropriate key code to be stored in the first storage unit (namely, the key code matching the predetermined key code) is supplied to the starting control apparatus, starting the engine is enabled. Thus, if a command to start the engine is later issued, the engine is started. In other words, if the key code not to be stored in the first storage unit is supplied to the starting control apparatus, starting the engine is not enabled and thus if the command to start the engine is issued, the engine is not started.

Therefore, according to the remote starting control apparatus (13), the starting state of the enable is detected, whereby whether or not the key code determined by the second determination unit is the key code to be stored in the first storage unit can be checked.

As remote starting control apparatus (14) according to the invention, in the remote starting control apparatus (12), the check unit checks whether or not the key code is the key code to be stored in the first storage unit based on the presence or absence of a key code output request from the starting control apparatus after supplying the key code determined by the second determination unit to the starting control apparatus.

According to the remote starting control apparatus (14), whether or not the key code is the key code to be stored in the first storage unit is checked based on the presence or absence of a key code output request from the starting control apparatus (immobilizer section) after the key code determined (to be the key code to be stored in the first storage unit) by the second determination unit is supplied to the starting control apparatus.

By the way, if the key code sent from the outside does not match the key code stored in the immobilizer section 6 (namely, is not the authorized key code), the immobilizer section 6 outputs a start signal, thereby making a key code output request, and repeats the processing until the key codes match (at a maximum of about 100 times every about 100 milliseconds), as described above.

In other words, if the key code sent from the outside matches the key code stored in the immobilizer section 6 (is the authorized key code), the immobilizer section 6 does not output the start signal. That is, the immobilizer section 6 does not issue a key code output request and thus whether or not the key code matches the authorized key code can be determined based on the presence or absence of a key code output request from the immobilizer section 6 after the key code is supplied.

Therefore, the remote starting control apparatus (14) can appropriately check whether or not the key code determined by the second determination unit is the key code to be stored in the first storage unit.

As remote starting control apparatus (15) according to the invention, any of the remote starting control apparatus (12) to (14) further includes a second storage control unit for storing the key code in the first storage unit if the check unit determines that the key code determined by the second determination unit is the key code to be stored in the first storage unit.

According to the remote starting control apparatus (15), if the check unit determines that the key code determined by the second determination unit is the key code to be stored in the first storage unit, the key code is stored in the first storage unit, so that the key code can be registered with good accuracy.

According to the invention, there is provided a starting control apparatus (1) including a second storage unit for storing a key code and having a function of sending a key code output request to a key code output unit that can output a key code based on predetermined operation, inputting a key code output in response to the request, determining whether or not the input key code matches the key code stored in the second storage unit, and if the key codes match, enabling an engine, etc., to be started, characterized by a second request unit for sending a key code output request to the key code output unit when a program mode to register a program mode in the second storage unit is set; a second acquisition unit for acquiring the key code output from the key code output unit in response to the request made by the second request unit; a third determination unit for comparing two or more key codes output from the key code output unit in response to two or more requests, acquired by the second acquisition unit, thereby determining the key code to be stored in the second storage unit from among the key codes; and a third storage control unit for storing the key code determined by the third determination unit in the second storage unit.

According to the starting control apparatus (1), two or more key codes output from the key code output unit (immobi amplifier) in response to two or more key code output requests are compared, thereby determining the key code to be stored in the second storage unit from among the key codes. Therefore, the key code that can be normally input without receiving the effect of noise, etc., is adopted as the key code to be stored in the second storage unit, so that the key code can be registered with good accuracy.

The key code output unit usually means the immobi amplifier 5 for extracting the key code (unique to the ignition key 1) stored in the transponder 3 of the ignition key 1 and outputting the extracted key code to the immobilizer section 6 (starting control apparatus), as described in [Related arts]; when viewed from the immobilizer section 6, however, the immobi amplifier 5 is simply a unit for outputting the key code upon reception of a key code output request.

Thus, any unit rather than the immobi amplifier 5 can be the key code output unit if the unit with a key code registered therein can output the registered key code in response to a key code output request. Therefore, for example, if the key code unique to the remote starting control apparatus is registered in the remote starting control apparatus, the key code can be registered in the immobilizer section of the starting control apparatus (1).

As starting control apparatus (2) according to the invention, in the starting control apparatus (1), the third determination unit uses any of the key codes acquired by the second acquisition unit as the reference and determines whether or not the reference key code matches a different key code acquired by the second acquisition unit and if the reference key code matches the different key code, determines that either of the key codes is the key code to be stored in the second storage unit.

According to the starting control apparatus (2), if it is determined that the reference key code matches the different key code (acquisition of the same key code), either of the key codes is determined to be the key code to be stored in the second storage unit, so that the key code can be registered with good accuracy.

BRIEF DESCRIPTION OF THE DRAWINGS

These and other objects and advantages of this invention will become more fully apparent from the following detailed description taken with the accompanying drawings in which:

FIG. 3 is a flowchart to show processing operation (engine starting processing) executed by the microcomputer in the remote starting control apparatus according to the first embodiment of the invention;

FIG. 7 is a flowchart to show processing operation (engine starting processing (for key code check)) executed by the microcomputer in the remote starting control apparatus according to the third embodiment of the invention;

FIG. 13 is a block diagram to schematically show the main part of an engine starting system in a related art;

FIG. 14 is a timing chart to show a flow from the instant at which an ignition key is inserted into a key cylinder to the instant at which an enable signal is output to an engine control section.

DETAILED DESCRIPTION OF THE PREFERRED EMBODIMENTS

Figure 1:
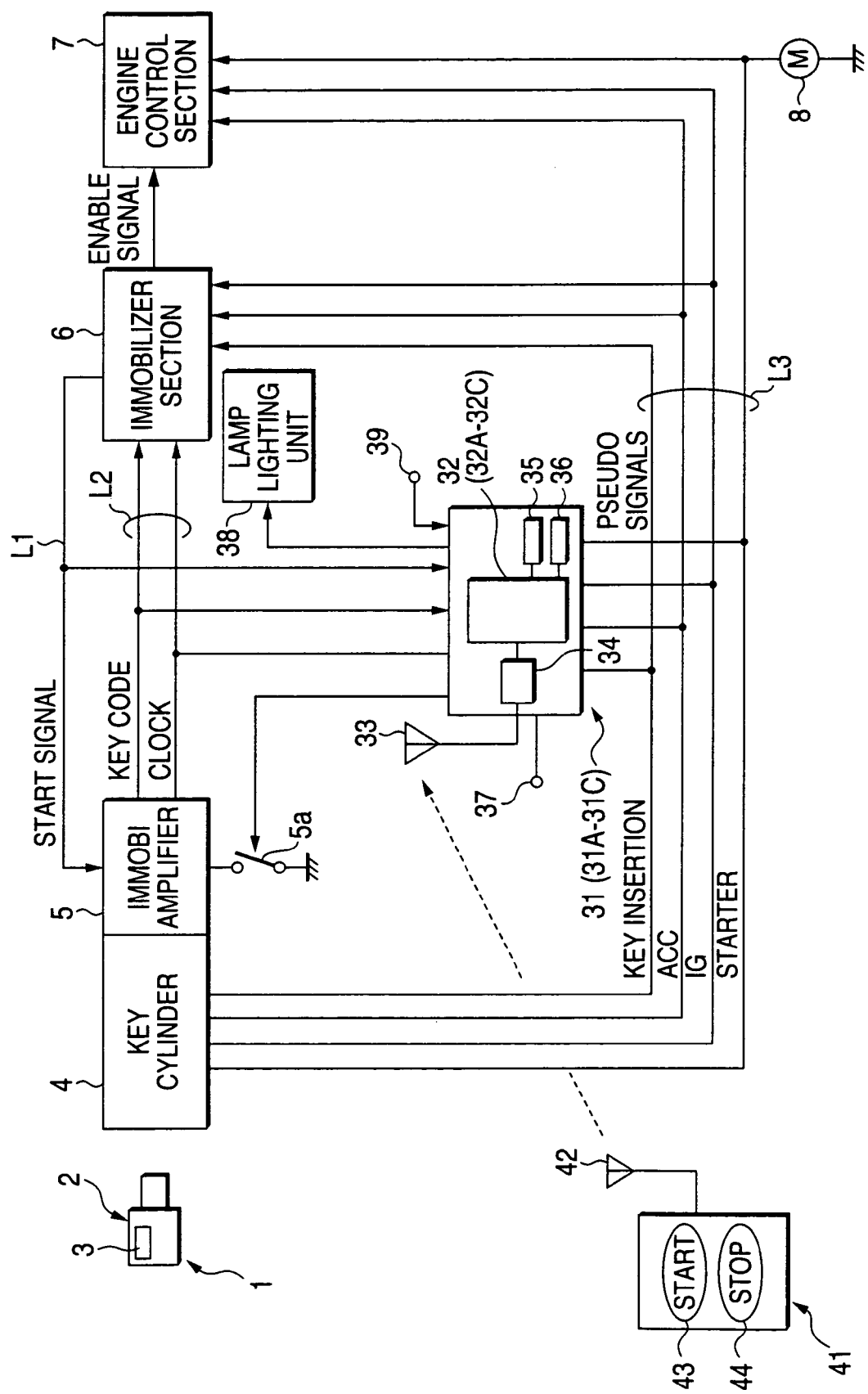
FIG. 1 is a block diagram to schematically show the main part of an engine starting system incorporating a remote starting control apparatus according to a first embodiment of the invention.

Referring now to the accompanying drawings, there are shown preferred embodiments of a remote starting control apparatus and a starting control apparatus according to the invention. FIG. 1 is a block diagram to schematically show the main part of an engine starting system incorporating a remote starting control apparatus according to a first embodiment of the invention. Components similar to those of the engine starting system previously described with reference to FIG. 13 are denoted by the same reference numerals in FIG. 1.

The engine starting system includes an ignition key 1 having a transponder 3 storing a specific key code and having a transmission function, contained in a grip section 2, a key cylinder 4, an immobi amplifier 5 attached to the key cylinder 4, an immobilizer section 6 storing a predetermined key code (key code matching the key code stored in the authorized ignition key 1) and having a theft prevention function, an engine control section 7 for performing control of engine starting, etc., a remote starting control apparatus 31, and a portable transmitter 41.

The remote starting control apparatus 31 includes a microcomputer 32, an antenna 33 and a reception unit 34 for receiving a signal transmitted from the portable transmitter 41, EEPROM 35 storing a remote ID code, EEPROM 36 for storing the key code matching the key code stored in the immobilizer section 6 (namely, the key code stored in the authorized ignition key 1), and a program switch 37 to be used to set a program mode (mode for writing the key code into the EEPROM 36).

The remote starting control apparatus 31 can control a switch 5a connected to the immobi amplifier 5, thereby shutting off power supply to the immobi amplifier 5 and can control a lamp lighting unit 38, thereby lighting a lamp.

An alternator L terminal 39 for outputting a low signal when the engine stops and outputting a high signal when the engine starts is connected to the remote starting control apparatus 31 for enabling the remote starting control apparatus 31 to determine whether or not the engine starts.

The portable transmitter 41 includes a microcomputer (not shown), an antenna 42 for transmitting a predetermined signal to the remote starting control apparatus 31, EEPROM (not shown) storing a remote ID code, a button switch 43 for giving an engine starting instruction from a remote location, and a button switch 44 for giving an engine stop instruction.

When the button switch 43 is pressed, the microcomputer of the portable transmitter 41 transmits a signal including the remote ID code and the engine starting instruction code to the outside from the antenna 42. On the other hand, when the button switch 44 is pressed, the microcomputer transmits a signal including the remote ID code and the engine stop instruction code to the outside from the antenna 42.

When a driver inserts the ignition key 1 into the key cylinder 4, a key insertion signal goes high and the immobilizer section 6 receiving the high signal transmits a pulse-like start signal to the immobi amplifier 5 via a signal line L1 for making a request to output key code. A timing chart from the instant at which the ignition key 1 is inserted into the key cylinder 4 to the instant at which an enable signal is output to the engine control section 7 is shown in FIG. 14.

Upon reception of the start signal, the immobi amplifier 5 supplies power by electromagnetic induction and starts the transponder 3 of the ignition key 1 inserted in the key cylinder 4, thereby extracting the key code (unique to the ignition key 1) stored in the transponder 3, and outputs the extracted key code together with a clock signal to the immobilizer section 6 via a signal line L2.

The immobilizer section 6 determines whether or not the key code (unique to the ignition key 1) sent from the immobi amplifier 5 matches the key code stored in the immobilizer section 6 (key code collation). If the immobilizer section 6 determines that the key codes match (key code match), it means that the authorized ignition key 1 is inserted in the key cylinder 4 and therefore the immobilizer section 6 regards the driver inserting the ignition key 1 into the key cylinder 4 as the authorized driver, and gives an enable signal for enabling the engine to be started to the engine control section 7.

On the other hand, if the immobilizer section 6 determines that the key code sent from the immobi amplifier 5 does not match the key code stored in the immobilizer section 6 (key code mismatch), the immobilizer section 6 again transmits the start signal to the immobi amplifier 5. This operation is repeated until both the key codes match (repeated at a maximum of about 100 times every about 100 milliseconds).

Upon reception of a starter signal output from the key cylinder 4 after reception of the enable signal, the engine control section 7 performs starting control of a starter motor; in contrast, if the engine control section 7 receives the starter signal with the enable signal not received, the engine control section 7 does not perform starting control of the starter motor.

Thus, if the key code stored in the transponder 3 of the ignition key 1 does not match the key code stored in the immobilizer section 6, the engine cannot be started. Thus, if an unauthorized ignition key or ignition switch is directly connected, the engine cannot be started and vehicle theft can be prevented. The remote starting control apparatus 31 is connected to signal lines L1 to L3 and can use the signal lines L1 to L3 to transmit and receive various signals.

Figure 2:
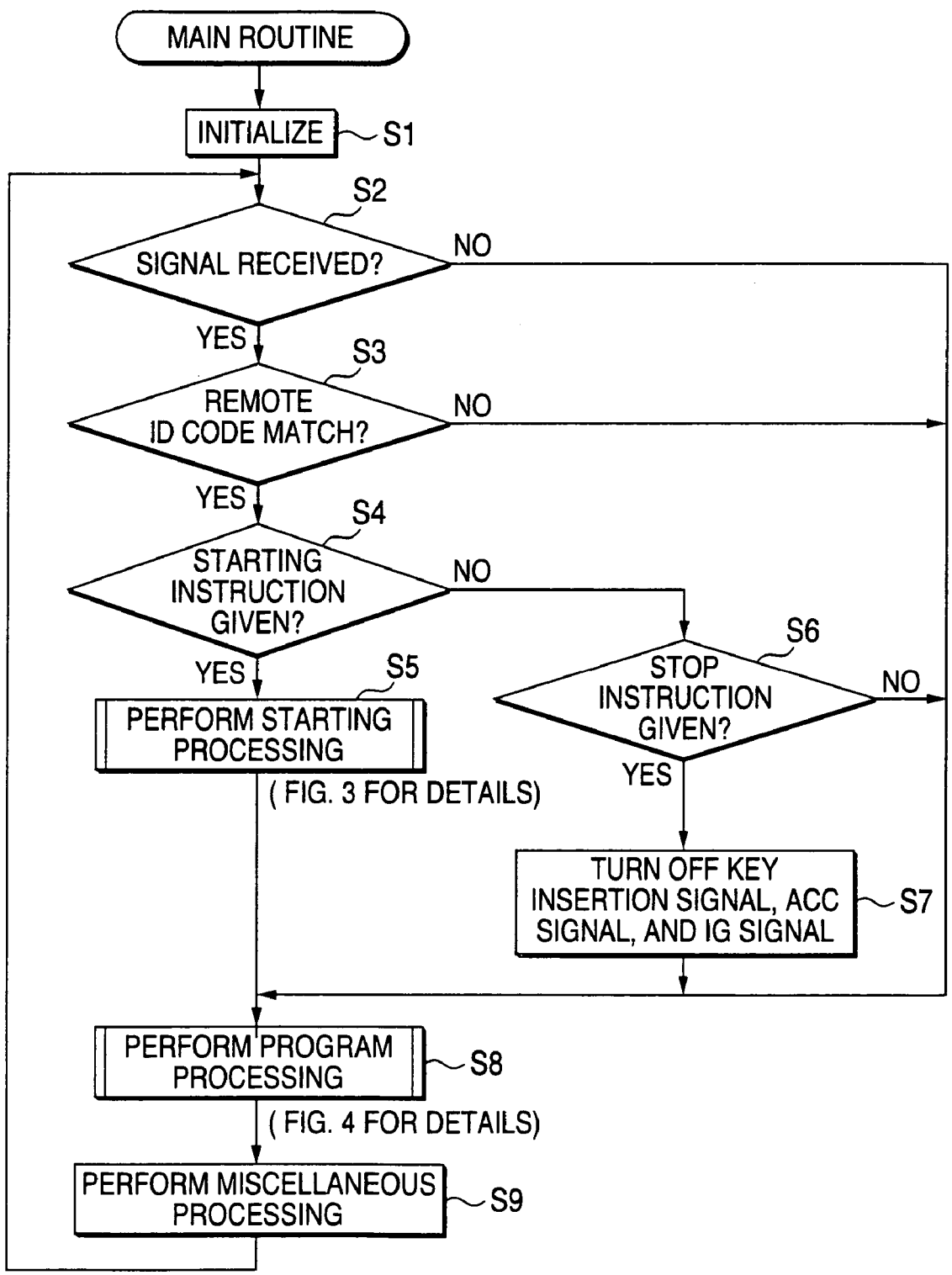
FIG. 2 is a flowchart to show processing operation (main routine) executed by a microcomputer in the remote starting control apparatus according to the first embodiment of the invention.

Next, processing operation (1) (main routine) executed by the microcomputer 32 in the remote starting control apparatus 31 according to the first embodiment will be discussed based on a flowchart of FIG. 2. To begin with, initialization is executed for clearing a counter, etc., (step S1). Next, whether or not a signal is received through the antenna 33 and the reception unit 34 is determined (step S2). If it is determined that a signal is received, whether or not the ID code contained in the received signal matches the remote ID code stored in the EEPROM 35 (step S3).

If it is determined that the ID code contained in the received signal matches the remote ID code (namely, a signal transmitted from the portable transmitter 41 carried by the authorized driver is received), then whether or not the signal contains an engine starting instruction code is determined (step S4).

If it is determined that the signal contains an engine starting instruction code, the process proceeds to step S5 and engine starting processing is performed (see FIG. 3 for details) and then the process proceeds to step S8 and program processing is performed (see FIG. 4 for details). Subsequently, the process proceeds to step S9 and miscellaneous processing is performed and the process returns to step S2.

On the other hand, if it is not determined that the signal contains an engine starting instruction code, then whether or not the signal contains an engine stop instruction code is determined (step S6). If it is determined that the signal contains an engine stop instruction code, engine stop processing is performed for turning off a key insertion signal, an ACC signal, and an IG signal to stop the engine (step S7) and then the process proceeds to step S8. If it is determined that the signal contains neither an engine starting instruction code nor an engine stop instruction code, the process proceeds to step S8.

If it is determined at step S2 that no signal is received or if it is determined at step S3 that although a signal is received, the signal is not a signal transmitted from the portable transmitter 41 carried by the authorized driver, processing for starting or stopping the engine or the like need not be performed and thus the process proceeds to step S8.

Next, processing operation (1)-1 (engine starting processing at step S5 in FIG. 2) executed by the microcomputer 32 in the remote starting control apparatus 31 according to the first embodiment will be discussed based on a flowchart of FIG. 3. Processing operation (1)-1 is operation performed when the portable transmitter 41 is operated for giving an engine start instruction from a remote location.

To begin with, the switch 5a is closed for shutting off the power supply to the immobi amplifier 5 to inhibit operation of the immobi amplifier 5 (step S11). The pseudo signals corresponding to a key insertion signal, an ACC signal, and an IG signal output when the authorized ignition key 1 is turned to an IG signal output position are supplied to the signal line L3 of ignition switch and are transmitted to the immobilizer section 6 (step S12). Upon reception of the key insertion signal, the immobilizer section 6 transmits a pulse-like start signal to the signal line L1 for making a request to output the key code, as described above.

Next, whether or not the start signal supplied from the immobilizer section 6 is received is determined (step S13). If it is determined that the start signal is not received, the process returns to step S13 and a wait is made for the start signal to be transmitted. On the other hand, if it is determined that the start signal is received, then the key code stored in the EEPROM 36 is transmitted together with a clock signal to the immobilizer section 6 via the signal line L2 (step S14) and then whether or not the start signal transmitted from the immobilizer section 6 has been again received within a predetermined time (for example, two seconds) (steps S15 and S16). Although the start signal essentially is transmitted to the immobi amplifier 5, the operation of the immobi amplifier 5 is inhibited and thus no problem occurs.

Upon reception of the key code transmitted via the signal line L2; the immobilizer section 6 determines whether or not the received key code (here, the key code stored in the EEPROM 36) matches the previously registered key code (key code collation). If the immobilizer section 6 determines that the key codes match, the immobilizer section 6 transmits an enable signal for enabling the engine to be started to the engine control section 7 and suppresses later transmitting the start signal. On the other hand, if the immobilizer section 6 determines that the received key code does not match the registered key code, the immobilizer section 6 again transmits the start signal. Retransmission of the start signal is repeated until the key codes match (repeated at a maximum of about 100 times every about 100 milliseconds).

Therefore, the case where the process proceeds to step S17 without again receiving the start signal within two seconds after transmission of the key code stored in the EEPROM 36 (after step S14) is:

a. the case where the key code stored in the EEPROM 36 matches the key code stored in the immobilizer section 6 and as the result of the key code collation in the immobilizer section 6, the key codes are determined to match and the enable signal is transmitted from the immobilizer section 6 to the engine control section 7; or b. the case where the key code stored in the EEPROM 36 does not match the key code stored in the immobilizer section 6 and thus transmission of the start signal from the immobilizer section 6 is repeated 100 times.

In contrast, the case where the start signal is again received within two seconds after transmission of the key code stored in the EEPROM 36 (after step S14) and the process returns to step S14 is:

c. the case where although the key code stored in the EEPROM 36 matches the key code stored in the immobilizer section 6, the key code is not normally received in the immobilizer section 6 because of the effect of noise, etc.; or d. the case where the key code stored in the EEPROM 36 does not match the key code stored in the immobilizer section 6.

If it is determined at steps S15 and S16 that the start signal is not again received from the immobilizer section 6 within two seconds (the case a or b), then the switch 5a is opened for releasing shutoff of the power supply to the immobi amplifier 5 (step S17) and then a counter C1 is set to 0 (step S18). The pseudo signal corresponding to a starter signal output when the ignition key 1 is turned to the starter output position is supplied to the signal line L3 of the ignition switch continuously for a predetermined time (for example, two seconds) and is transmitted to the engine control section 7 (step S19).

After this, a wait time is provided for a predetermined time (for example, four seconds) (step S20) and then whether or not the engine starts is determined based on the signal provided from the alternator L terminal 39 (step S21). If it is determined that the engine starts, processing operation (1)-1 is terminated.

On the other hand, if it is determined that the engine does not start, then the counter C1 is incremented by one (step S22), and whether or not the counter C1 incremented by one is equal to or greater than a predetermined value (for example, two) is determined (step S23). If it is determined that the engine does not start although the counter C1 is two or more, namely, the pseudo signal corresponding to the starter signal is transmitted twice, the case is assumed to be the case b, and processing operation (1)-1 is terminated. On the other hand, if it is determined that the counter C1 is less than two, the process returns to step S19 and the pseudo signal corresponding to the starter signal is again transmitted.

Figure 4A:
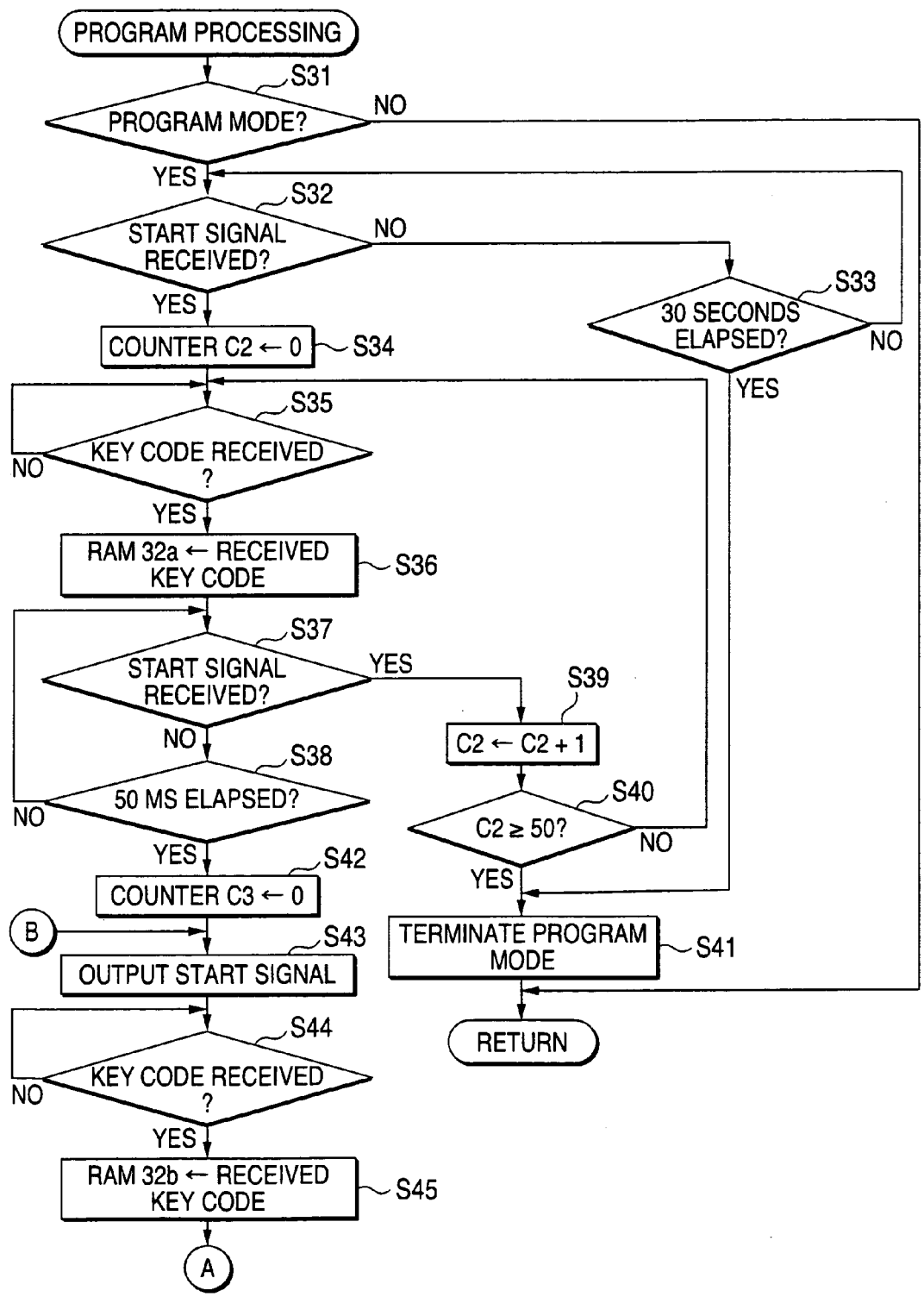
FIG. 4A is a flowchart to show processing operation (program processing) executed by the microcomputer in the remote starting control apparatus according to the first embodiment of the invention.

Next, processing operation (1)-2 (program processing at step S8 in FIG. 2) executed by the microcomputer 32 in the remote starting control apparatus 31 according to the first embodiment will be discussed based on flowcharts of FIGS. 4A and 4B. Processing operation (1)-2 is operation for writing the key code registered in the transponder 3 of the ignition key 1 into the EEPROM 36. This writing operation is accomplished as the authorized ignition key 1 is inserted into the key cylinder 4 when the program mode is set.

To begin with, whether or not the program mode is set is determined (step S31). If it is determined that the program mode is set, then the process proceeds to step S32 and processing for writing the key code into the EEPROM 36 is started. On the other hand, if it is not determined that the program mode is set, processing operation (1)-2 is terminated.

Here, as the program switch 37 is pressed, the program mode is set, but the program mode setting method is not limited to it. The program mode may be set, for example, as specific operation using the button switch 43 or 44 of the portable transmitter 41 is performed. In this case, the program switch 37 is not indispensable and thus the configuration can be simplified.

At steps S32 and S33, to check whether or not the ignition key 1 has been inserted into the key cylinder 4 within a predetermined time (for example, 30 seconds), whether or not the start signal supplied from the immobilizer section 6 to the signal line L1 has been received within 30 seconds is determined.

Upon reception of a key insertion signal, the immobilizer section 6 supplies a pulse-like start signal to the signal line L1 for making a request to output the key code, as described above.

If it is determined at step S32 that the start signal has been received, namely, the ignition key 1 has been inserted into the key cylinder 4, then a counter C2 is set to 0 (step S34) and then whether or not the key code supplied from the immobi amplifier 5 to the signal line L2 (namely, the key code extracted from the transponder 3) is received is determined (step S35).

Upon reception of the start signal, the immobi amplifier 5 starts the transponder 3 of the ignition key 1 inserted in the key cylinder 4, thereby extracting the key code (unique to the ignition key 1) stored in the transponder 3, and supplies the extracted key code to the signal line L2, as described above.

On the other hand, if it is determined at steps S32 and S33 that the ignition key 1 is not inserted in the key cylinder 4 within 30 seconds, it is assumed that the program mode is set by mistake, and the process proceeds to step S41 for releasing the program mode. Then, processing operation (1)-2 is terminated.

If it is determined at step S35 that the key code is received, the received key code is once stored in RAM 32a (not shown) in the microcomputer 32 as the key code used as the comparison reference (step S36). Then, whether or not the start signal transmitted from the immobilizer section 6 has been again received within a predetermined time (for example, 50 milliseconds) is determined (steps S37 and S38). On the other hand, if it is not determined that the key code is received, the process returns to step S35.

As described above, upon reception of the key code transmitted via the signal line L2, the immobilizer section 6 determines whether or not the received key code (here, the key code unique to the ignition key 1) matches the previously registered key code (key code collation). If the immobilizer section 6 determines that the key codes match (key code match), the immobilizer section 6 sends an enable signal for enabling the engine to be started to the engine control section 7 and suppresses later transmitting the start signal. On the other hand, if the immobilizer section 6 determines that the received key code does not match the registered key code (key code mismatch), the immobilizer section 6 repeats transmission of the start signal (at a maximum of about 100 times every about 100 milliseconds).

Therefore, either of the following two cases a and b is possible as the case where the process proceeds to step S42 without again receiving the start signal within 500 milliseconds (100 milliseconds plus α) after reception of the key code (after step S35):

a. the case where the key code unique to the ignition key 1 matches the key code stored in the immobilizer section 6 and as the result of the key code collation in the immobilizer section 6, the key codes are determined to match and the enable signal is transmitted from the immobilizer section 6 to the engine control section 7. In this case, the key code determined to match in the immobilizer section 6 is stored in the RAM 32a (however, a different key code may be stored because of the effect of noise, etc.,).

b. the case where the key code unique to the ignition key 1 does not match the key code stored in the immobilizer section 6 and thus transmission of the start signal from the immobilizer section 6 is repeated 100 times. However, if the number of the repetitions exceeds 50 at steps S39 and S40, the process does not proceed to steps S42 and proceeds to step S41, as described later in detail.

In contrast, the case where the start signal is again received within 500 milliseconds after reception of the key code (after step S35) and the process proceeds to step S39 is c. the case where although the key code unique to the ignition key 1 matches the key code stored in the immobilizer section 6, the immobilizer section 6 does not determine that the key codes match because of the effect of noise, etc.; or d. the case where the key code unique to the ignition key 1 does not match the key code stored in the immobilizer section 6.

If it is determined at step S37 that the start signal is again received from the immobilizer section 6, it is assumed that the key code matching the key code stored in the immobilizer section 6 is not received in the immobilizer section 6 (the case c, d), the counter C2 is incremented by one (step S39), and whether or not the counter C2 incremented by one is equal to or greater than a predetermined value (for example, 50) is determined (step S40).

If it is determined that the key codes do not match in the immobilizer section 6 although the counter C2 is 50 or more, namely, the key code unique to the ignition key 1 is transmitted 50 times or more to the immobilizer section 6, the case is assumed to be the case b, the process proceeds to step S41, the program mode is released, and processing operation (1)-2 is terminated.

On the other hand, if it is determined that the counter C2 is less than 50, the process returns to step S35 and a wait is made for a key code to be transmitted. Upon reception of a key code, the new received key code is again stored in the RAM 32a as a new comparison reference key code.

If it is determined at steps S37 and S38 that the start signal is not again received from the immobilizer section 6 within 500 milliseconds, namely, the key code determined to match in the immobilizer section 6 is stored in the RAM 32a (however, a different key code may be stored because of the effect of noise, etc.,) (the case a), then a counter 3 is set to 0 (step S42) and the immobilizer section 6 supplies the start signal to the signal line L1, thereby transmitting the start signal to the immobi amplifier 5 (step S43). Then, whether or not the key code supplied from the immobi amplifier 5 to the signal line L2 (namely, the key code extracted from the transponder 3) is received is determined (step S44).

Upon reception of the start signal, the immobi amplifier 5 starts the transponder 3 of the ignition key 1 inserted in the key cylinder 4, thereby extracting the key code (unique to the ignition key 1) stored in the transponder 3, and supplies the extracted key code to the signal line L2, as described above.

Figure 4B:
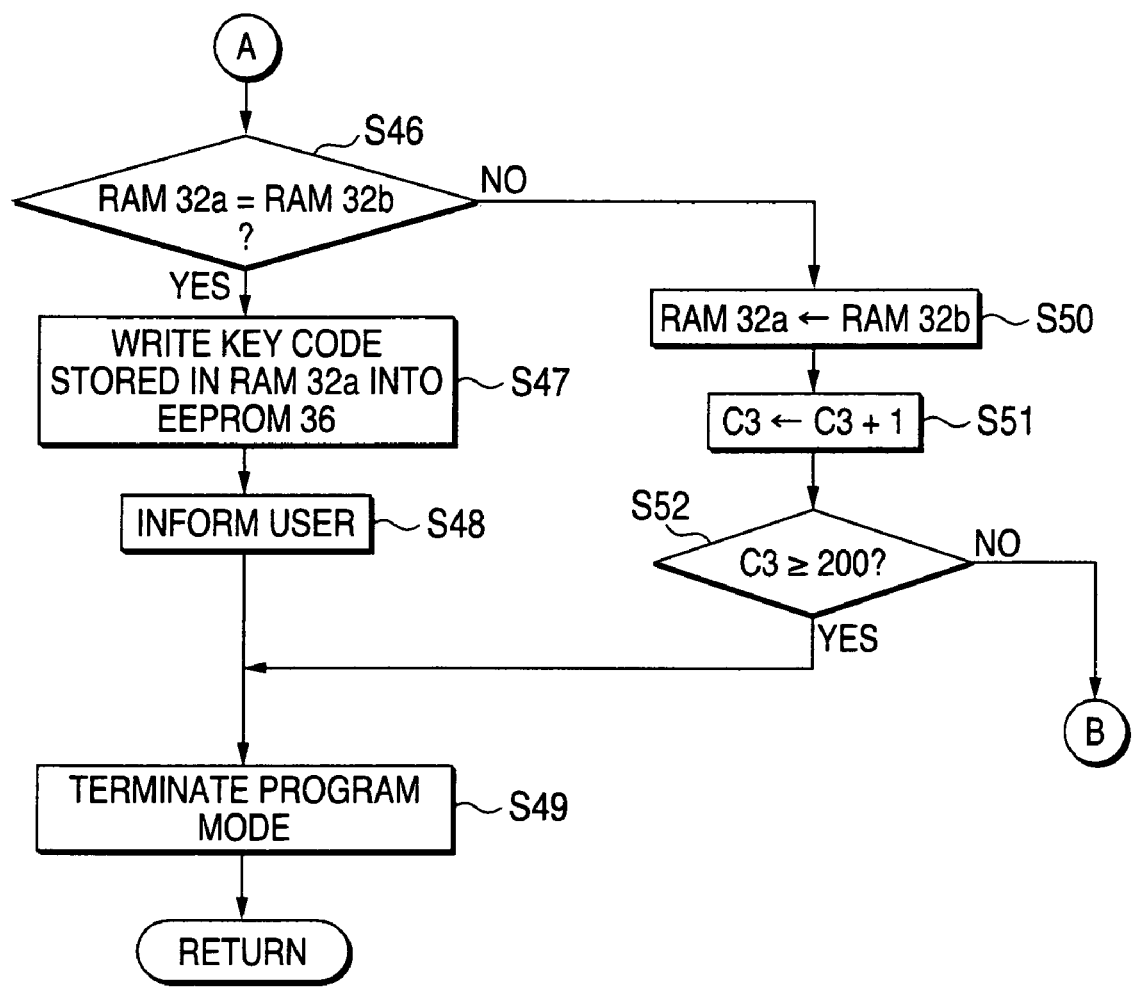
FIG. 4B is a flowchart to show processing operation (program processing) executed by the microcomputer in the remote starting control apparatus according to the first embodiment of the invention.

If it is determined at step S44 that the key code is received, the received key code is once stored in RAM 32b (not shown) in the microcomputer 32 (step S45) and then whether or not the comparison reference key code stored in the RAM 32a and the key code stored in the RAM 32b match is determined (step S46 in FIG. 4B). On the other hand, if it is not determined that the key code is received, the process returns to step S44 and a wait is made for the key code to be transmitted.

If it is determined at step S46 that the key codes match, it is assumed that the key code unique to the ignition key 1 can be normally received, and the key code stored in the RAM 32a (or the RAM 32b) is written into the EEPROM 36 (step S47). To inform the user that the key code can be normally registered, the lamp lighting unit 38 is controlled for blinking the lamp (step S48) and then the program mode is released (step S49) and processing operation (1)-2 is terminated.

On the other hand, if it is not determined at step S46 that the key codes match, the key code stored in the RAM 32b is stored in the RAM 32a as a new comparison reference key code (step S50). Next, a counter C3 is incremented by one (step S51) and whether or not the counter C3 incremented by one is equal to or greater than a predetermined value (for example, 200) is determined (step S52).

If it is determined that the counter C3 is 200 or more, it is assumed that whether or not the key codes match cannot be determined for some reason, and the program mode is released (step S49) and processing operation (1)-2 is terminated. On the other hand, if it is determined that the counter C3 is less than 200, the process returns to step S43 (FIG. 4A) and the start signal is supplied to the signal line L1, thereby again transmitting the start signal to the immobi amplifier 5.

Next, an engine starting system incorporating a remote starting control apparatus according to a second embodiment of the invention will be discussed. The engine starting system has the same configuration as the engine starting system previously described with reference to FIG. 1 except for remote starting control apparatus 31 or microcomputer 32 forming a part of the remote starting control apparatus 31 and therefore the remote starting control apparatus and the microcomputer are denoted by different reference numerals (31A and 32A) from those in FIG. 1 and other components will not be discussed again.

Processing operation (2) (main routine) executed by the microcomputer 32A in the remote starting control apparatus 31A according to the second embodiment of the invention is similar to processing operation (1) (main routine) executed by the microcomputer 32 in the remote starting control apparatus 31 according to the first embodiment previously described with reference to FIG. 2 and therefore will not be discussed again.

Processing operation (2)-1 (engine starting processing) executed by the microcomputer 32A in the remote starting control apparatus 31A is also similar to processing operation (1)-1 (engine starting processing) executed by the microcomputer 32 in the remote starting control apparatus 31 previously described with reference to FIG. 3 and therefore will not be discussed again.

Figure 5A:
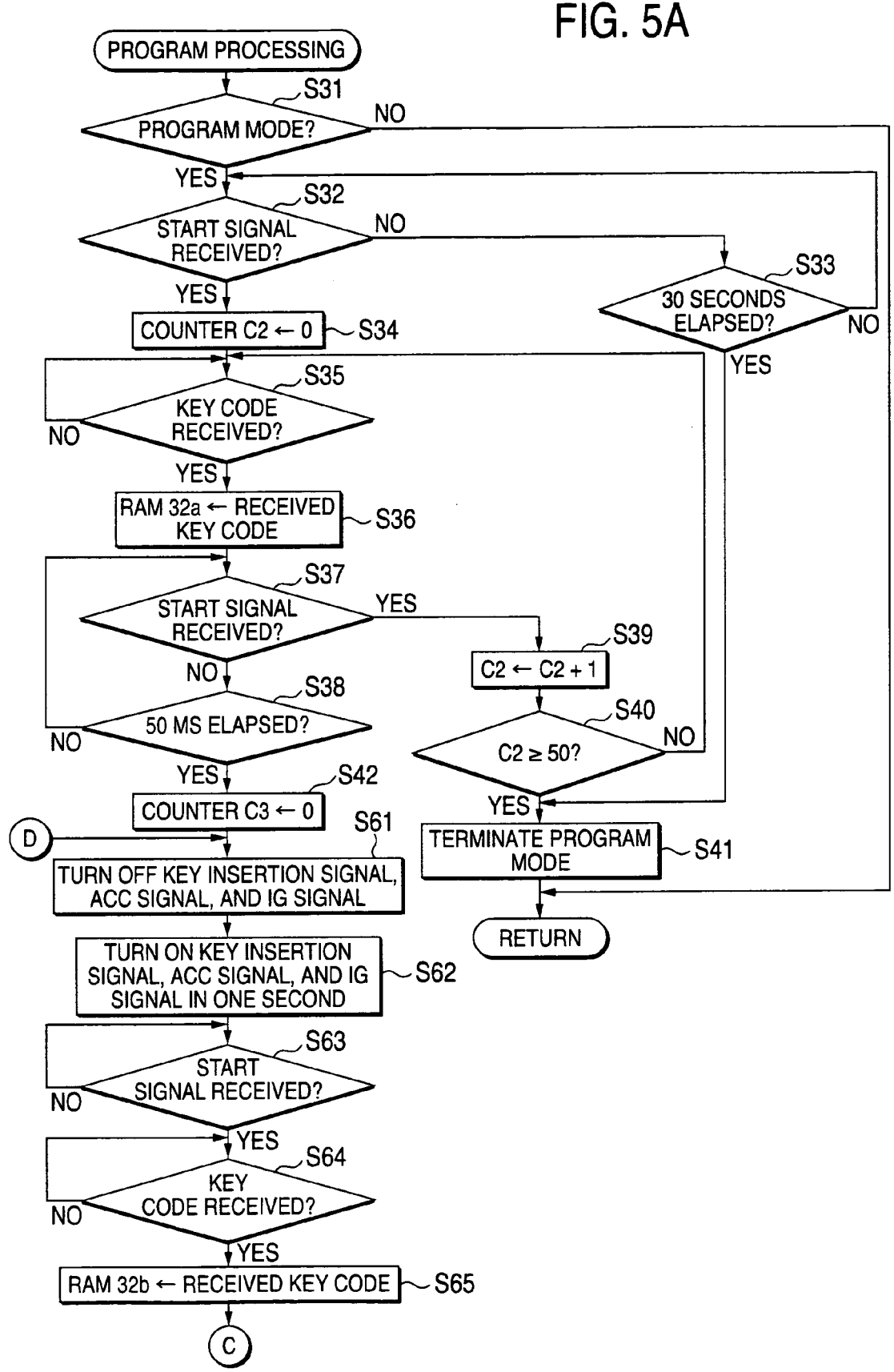
FIG. 5A is a flowchart to show processing operation (program processing) executed by a microcomputer in a remote starting control apparatus according to a second embodiment of the invention.
Figure 5B:
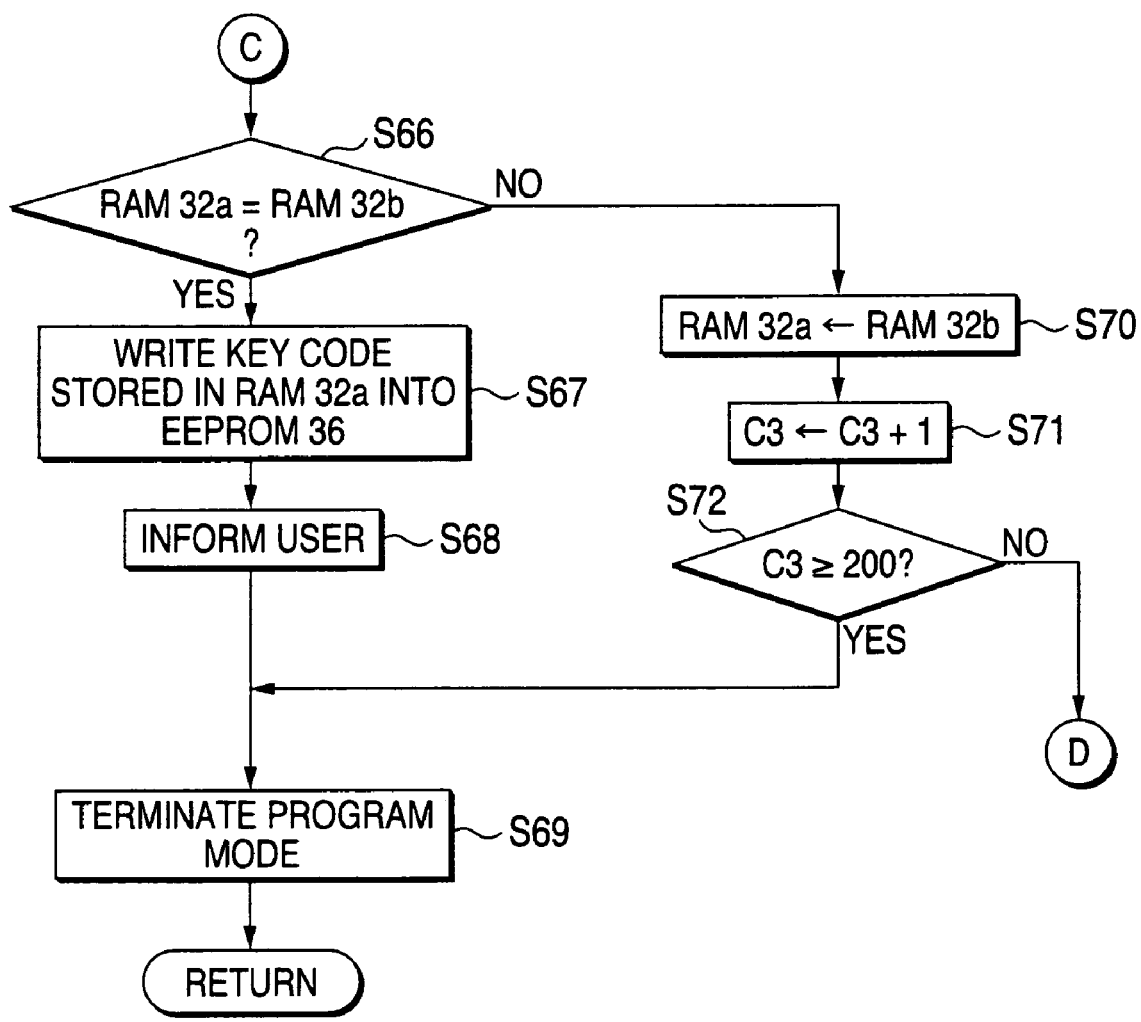
FIG. 5B is a flowchart to show processing operation (program processing) executed by the microcomputer in the remote starting control apparatus according to the second embodiment of the invention.

Processing operation (2)-2 (program processing) executed by the microcomputer 32A in the remote starting control apparatus 31A according to the second embodiment will be discussed based on flowcharts of FIGS. 5A and 5B. Processing operation (2)-2 is a modification of the program processing at step S8 in FIG. 2 and is a change in a part of processing operation (1)-2 previously described with reference to FIGS. 4A and 4B and therefore some of the description will not be given.

The case where determination of YES is made at step S38 is the case where the key code unique to an ignition key 1 matches the key code stored in an immobilizer section 6 (namely, the authorized ignition key 1 is inserted in a key cylinder 4), the key codes are determined to match as the result of key code collation in the immobilizer section 6, and an enable signal is transmitted from the immobilizer section 6 to an engine control section 7.

In this case, the key code determined to match in the immobilizer section 6 is stored in RAM 32a (not shown) in the microcomputer 32A. However, a different key code maybe stored because of the effect of noise, etc.

If determination of YES is made at step S38, then a counter C3 is set to 0 (step S42) and then a key insertion signal, an ACC signal, and an IG signal supplied to the immobilizer section 6 are turned off (step S61) and are turned on in a predetermined time (for example, one second) after the signals are turned off, whereby a state in which insertion operation of the ignition key 1 into the key cylinder 4 is performed is produced artificially (step S62). Then, whether or not a start signal is received is determined (step S63).

Upon reception of the key insertion signal (namely, the insertion operation of the ignition key 1 into the key cylinder 4), the immobilizer section 6 supplies a pulse-like start signal to a signal line L1 for making a request to output the key code, as described above.

If it is determined at step S63 that the start signal is received, then whether or not the key code supplied from an immobi amplifier 5 to a signal line L2 (namely, the key code extracted from a transponder 3) is received is determined (step S64). On the other hand, if it is not determined that the start signal is received, the process returns to step S63.

Upon reception of the start signal, the immobi amplifier 5 starts the transponder 3 of the ignition key 1 inserted in the key cylinder 4, thereby extracting the key code (unique to the ignition key 1) stored in the transponder 3, and supplies the extracted key code to the signal line L2, as described above.

If it is determined at step S64 that the key code is received, the received key code is once stored in RAM 32b (not shown) in the microcomputer 32A (step S65). Next, whether or not the comparison reference key code stored in the RAM 32a and the key code stored in the RAM 32b match is determined (step S66 in FIG. 5B). On the other hand, if it is not determined that the key code is received, the process returns to step S64 and a wait is made for the key code to be transmitted.

If it is determined at step S66 that the key codes match, it is assumed that the key code unique to the ignition key 1 can be normally received, and the key code stored in the RAM 32a (or the RAM 32b) is written into EEPROM 36 (step S67). To inform the user that the key code can be normally registered, a lamp lighting unit 38 is controlled for blinking a lamp (step S68) and then the program mode is released (step S69) and processing operation (2)-2 is terminated.

On the other hand, if it is not determined at step S66 that the key codes match, the key code stored in the RAM 32b is stored in the RAM 32a as a new comparison reference key code (step S70). Next, a counter C3 is incremented by one (step S71) and whether or not the counter C3 incremented by one is equal to or greater than a predetermined value (for example, 200) is determined (step S72).

If it is determined that the counter C3 is 200 or more, it is assumed that whether or not the key codes match cannot be determined for some reason, and the program mode is released (step S69) and processing operation (2)-2 is terminated. On the other hand, if it is determined that the counter C3 is less than 200, the process returns to step S61 (FIG. 5A) and the state in which insertion operation of the ignition key 1 into the key cylinder 4 is performed is again produced artificially.

According to the remote starting control apparatus according to the first or second embodiment, upon reception of a starting command of the engine, etc., by remote operation, the key code stored in the EEPROM 36 is supplied to the immobilizer section 6. Thus, if the key code matching the key code stored in the immobilizer section 6 is stored in the EEPROM 36, when a starting command of the engine by remote operation is received, the key code is supplied to the immobilizer section 6, which then enables the engine to be started as if the authorized ignition key 1 were inserted into the key cylinder 4.

Accordingly, if the authorized ignition key 1 is not inserted into the key cylinder 4 and not turned, the engine can be started by remote operation. As the engine, an engine of an internal combustion engine automobile, a power generator such as a motor of an electric automobile, or the like can be named.

Further, according to the remote starting control apparatus according to the first or second embodiment, if the same key code is acquired two successive times, the key code is stored in the EEPROM 36. Therefore, the key code that can be normally input without receiving the effect of noise, etc., is stored in the EEPROM 36, so that the key code is registered with good accuracy.

The remote starting control apparatus according to the second embodiment artificially produces the state in which insertion operation of the ignition key 1 into the key cylinder 4 is performed. If the state in which the insertion operation is performed is produced although the state is produced artificially, the immobilizer section 6 sends a key code output request to the immobi amplifier 5, which then outputs the key code.

Accordingly, although the remote starting control apparatus 31 according to the first embodiment makes a key code output request, the remote starting control apparatus 31A according to the second embodiment makes it possible to acquire two or more key codes to be stored in the EEPROM 36 if the remote starting control apparatus 31A does not make a key code output request.

In the remote starting control apparatus according to the first or second embodiment, if the same key code is acquired two successive times, the key code is stored in the EEPROM 36. The successive number of times is not limited to two and may be three or more. In a remote starting control apparatus according to a different embodiment, if the same key code is acquired twice or more unsuccessively, the key code may be stored in the EEPROM 36.

In the remote starting control apparatus according to the first or second embodiment, the comparison reference key code stored in the RAM 32a is always updated to a new key code (step S50 in FIG. 4B, step S70 in FIG. 5B); in a remote starting control apparatus according to a different embodiment, the key code determined to match in the immobilizer section 6 may be continuously used as the comparison reference key code without updating the comparison reference key code. To do this, step S50 (step S70) may be deleted.

Next, an engine starting system incorporating a remote starting control apparatus according to a third embodiment of the invention will be discussed. The engine starting system has the same configuration as the engine starting system previously described with reference to FIG. 1 except for remote starting control apparatus 31 or microcomputer 32 forming a part of the remote starting control apparatus 31 and therefore the remote starting control apparatus and the microcomputer a denoted by different reference numerals (31B and 32B) from those in FIG. 1 and other components will not be discussed again.

Processing operation (3) (main routine) executed by the microcomputer 32B in the remote starting control apparatus 31B according to the third embodiment of the invention is similar to processing operation (1) (main routine) executed by the microcomputer 32 in the remote starting control apparatus 31 according to the first embodiment previously described with reference to FIG. 2 and therefore will not be discussed again.

Processing operation (3)-1 (engine starting processing) executed by the microcomputer 32B in the remote starting control apparatus 31B is also similar to processing operation (1)-1 (engine starting processing) executed by the microcomputer 32 in the remote starting control apparatus 31 previously described with reference to FIG. 3 and therefore will not be discussed again.

Figure 6:
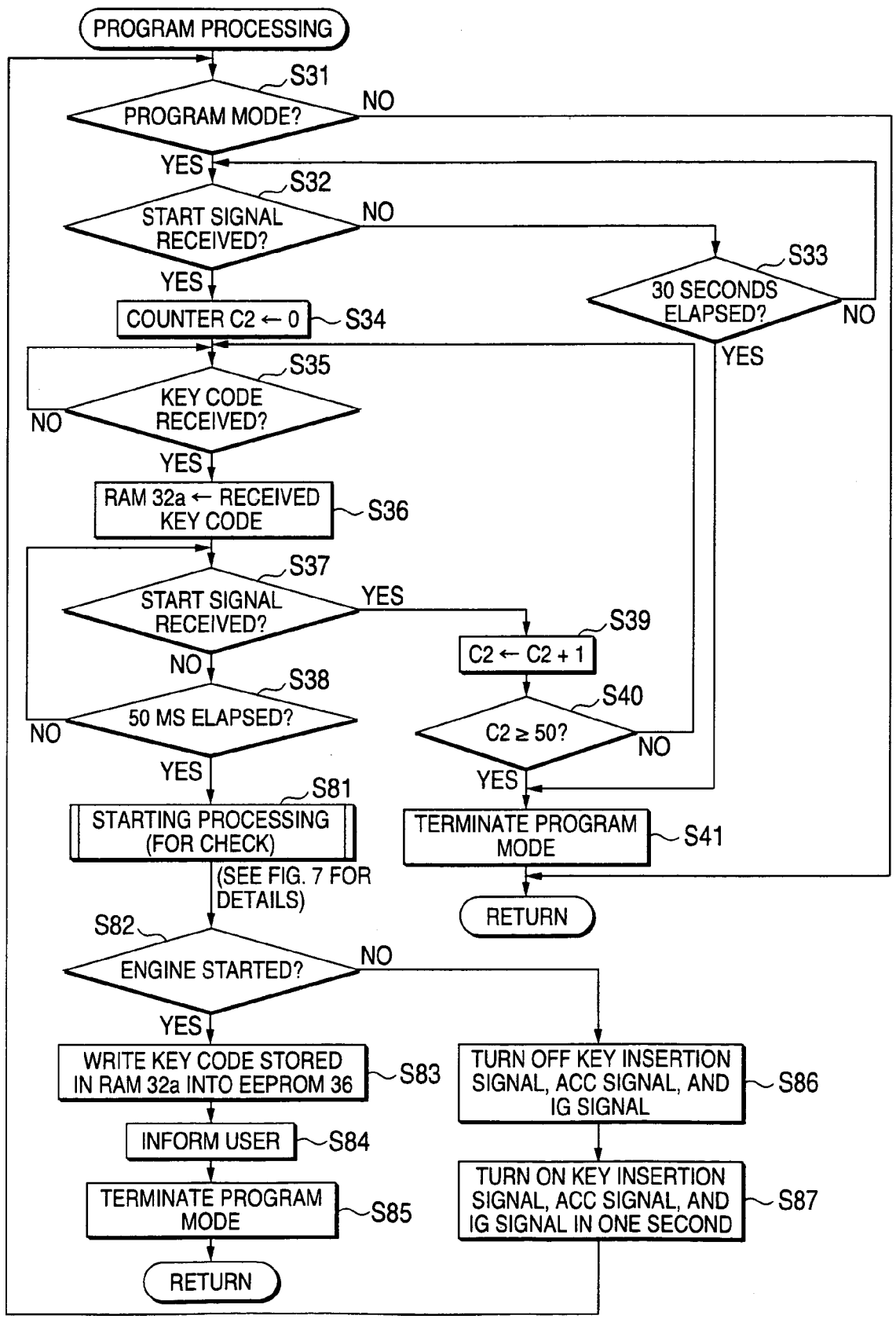
FIG. 6 is a flowchart to show processing operation (program processing) executed by a microcomputer in a remote starting control apparatus according to a third embodiment of the invention.

Processing operation (3)-2 (program processing) executed by the microcomputer 32B in the remote starting control apparatus 31B according to the third embodiment will be discussed based on a flowchart of FIG. 6. Processing operation (3)-2 is a modification of the program processing at step S8 in FIG. 2 and is a change in a part of processing operation (1)-2 previously described with reference to FIGS. 4A and 4B and therefore some of the description will not be given.

The case where determination of YES is made at step S38 is the case where the key code unique to an ignition key 1 matches the key code stored in an immobilizer section 6 (namely, the authorized ignition key 1 is inserted in a key cylinder 4), the key codes are determined to match as the result of key code collation in the immobilizer section 6, and an enable signal is transmitted from the immobilizer section 6 to an engine control section 7, as described above.

In this case, the key code determined to match in the immobilizer section 6 is stored in RAM 32a (not shown) in the microcomputer 32B. However, a different key code maybe stored because of the effect of noise, etc.

If determination of YES is made at step S38, engine starting processing is performed using the key code stored in the RAM 32a and whether or not the key code stored in the RAM 32a is the authorized key code is checked (step S81, see FIG. 7 for details).

Then, whether or not the engine starts is determined based on the signal provided from an alternator L terminal 39 (step S82). If it is determined that the engine starts, it is assumed that the key code stored in the RAM 32a is the authorized key code, and the key code stored in the RAM 32a is written into EEPROM 36 (step S83). Next, to inform the user that the key code can be normally registered, a lamp lighting unit 38 is controlled for blinking a lamp (step S84) and then the program mode is released (step S85) and processing operation (3)-2 is terminated.

Here, the engine starting processing is performed automatically and the user can determine whether or not the key code is normally registered based on the starting state of the engine. Thus, if informing processing at step S84 is skipped, the user can make the determination properly. If step S84 can be deleted, the check lamp, etc., becomes unnecessary, so that the configuration can be simplified.

On the other hand, if it is not determined at step S82 that the engine starts, it is assumed that the key code stored in the RAM 32a is not the authorized key code. Then, a key insertion signal, an ACC signal, and an IG signal supplied to the immobilizer section 6 are turned off (step S86) and are turned on in a predetermined time (for example, one second) after the signals are turned off, whereby a state in which insertion operation of the ignition key 1 into the key cylinder 4 is performed is produced artificially (step S87). Then, the process returns to step S31.

Next, processing operation (3)-2a (engine starting processing (for key code check) at step S81 in FIG. 6) executed by the microcomputer 32B in the remote starting control apparatus 31B according to the third embodiment will be discussed based on a flowchart of FIG. 7. Processing operation (3)-2a is a change in a part of engine starting processing previously described with reference to FIG. 3; step S12 in FIG. 3 is changed to steps S92a and S92b and step S14 in FIG. 3 is changed to step S94.

At steps S92a and S92b, a key insertion signal, an ACC signal, and an IG signal supplied to the immobilizer section 6 are turned off and are turned on in a predetermined time (for example, one second) after the signals are turned off, whereby a state in which insertion operation of the ignition key 1 into the key cylinder 4 is performed is produced artificially for causing the immobilizer section 6 to output a start signal.

At step S94, the key code stored in the RAM 32a is transmitted together with a clock signal to the immobilizer section 6 via a signal line L2.

In the remote starting control apparatus according to the third embodiment, to check whether or not the key code stored in the RAM 32a is the authorized key code, the number of retries to start the engine is set to the same number of retries as that at the normal time (here, two). However, in a different embodiment, the number of retries may be set to a different number of retries from that at the normal time.

Next, an engine starting system incorporating a remote starting control apparatus according to a fourth embodiment of the invention will be discussed. The engine starting system has the same configuration as the engine starting system previously described with reference to FIG. 1 except for remote starting control apparatus 31 or microcomputer 32 forming a part of the remote starting control apparatus 31 and therefore the remote starting control apparatus and the microcomputer are denoted by different reference numerals (31C and 32C) from those in FIG. 1 and other components will not be discussed again.

Processing operation (4) (main routine) executed by the microcomputer 32C in the remote starting control apparatus 31C according to the fourth embodiment of the invention is similar to processing operation (1) (main routine) executed by the microcomputer 32 in the remote starting control apparatus 31 according to the first embodiment previously described with reference to FIG. 2 and therefore will not be discussed again.

Processing operation (4)-1 (engine starting processing) executed by the microcomputer 32C in the remote starting control apparatus 31C is also similar to processing operation (1)-1 (engine starting processing) executed by the microcomputer 32 in the remote starting control apparatus 31 previously described with reference to FIG. 3 and therefore will not be discussed again.

Figure 8A:
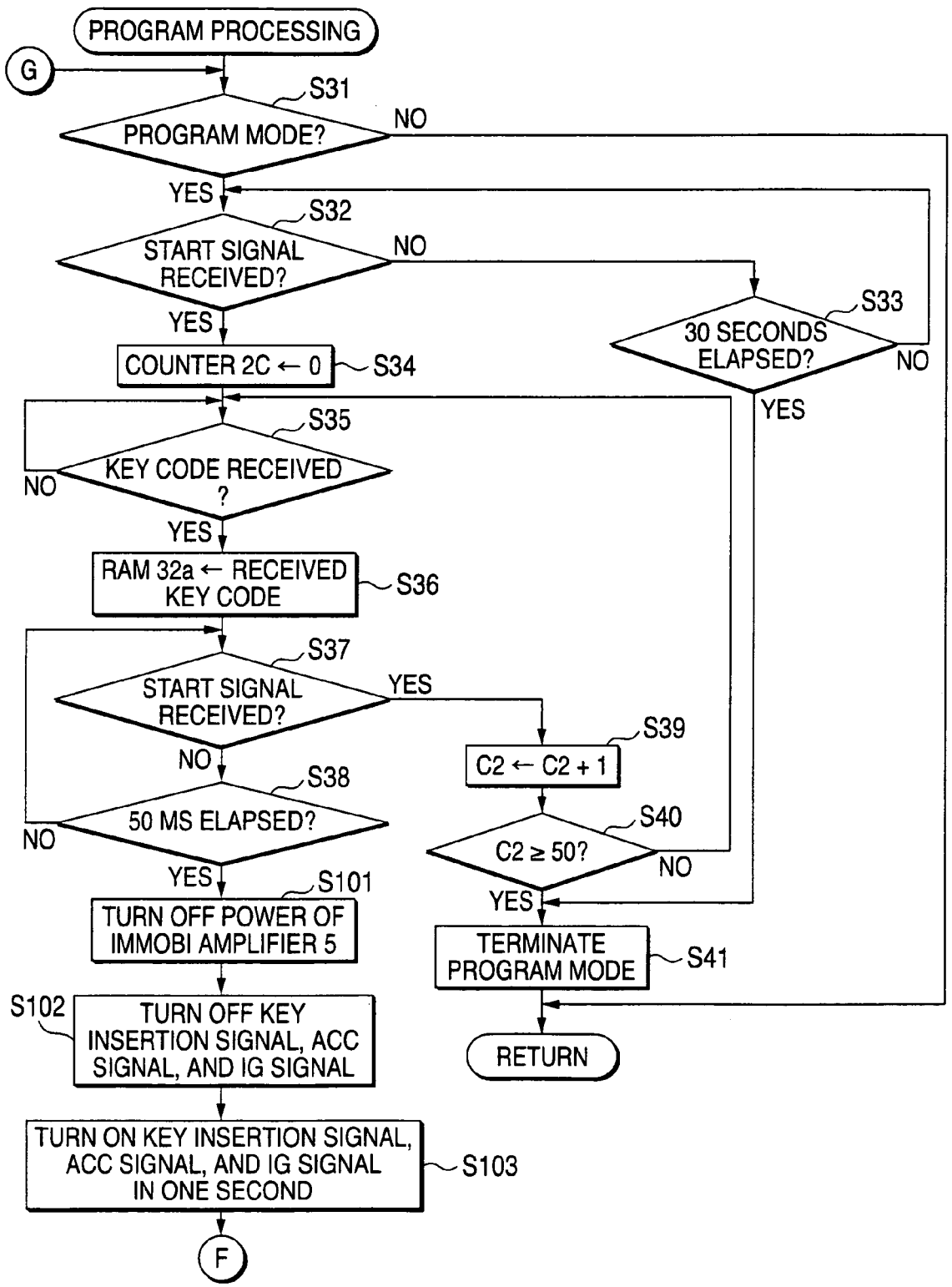
FIG. 8A is a flowchart to show processing operation (program processing) executed by a microcomputer in a remote starting control apparatus according to a fourth embodiment of the invention.

Processing operation (4)-2 (program processing) executed by the microcomputer 32C in the remote starting control apparatus 31C according to the fourth embodiment will be discussed based on flowcharts of FIGS. 8A and 8B. Processing operation (4)-2 is a modification of the program processing at step S8 in FIG. 2 and is a change in a part of processing operation (1)-2 previously described with reference to FIGS. 4A and 4B and therefore some of the description will not be given.

The case where determination of YES is made at step S38 is the case where the key code unique to an ignition key 1 matches the key code stored in an immobilizer section 6 (namely, the authorized ignition key 1 is inserted in a key cylinder 4), the key codes are determined to match as the result of key code collation in the immobilizer section 6, and an enable signal is transmitted from the immobilizer section 6 to an engine control section 7, as described above.

In this case, the key code determined to match in the immobilizer section 6 is stored in RAM 32a (not shown) in the microcomputer 32C. However, a different key code may be stored because of the effect of noise, etc.

If determination of YES is made at step S38, the process proceeds to step S101, engine starting processing is performed using the key code stored in the RAM 32a, and whether or not the key code stored in the RAM 32a is the authorized key code is checked.

To begin with, a switch 5a is closed for shutting off the power supply to an immobi amplifier 5 to inhibit operation of the immobi amplifier 5 (step S101). Next, a key insertion signal, an ACC signal, and an IG signal supplied to the immobilizer section 6 are turned off (step S102) and are turned on in a predetermined time (for example, one second) after the signals are turned off, whereby a state in which insertion operation of the ignition key 1 into the key cylinder 4 is performed is produced artificially for causing the immobilizer section 6 to output a start signal.

Figure 8B:
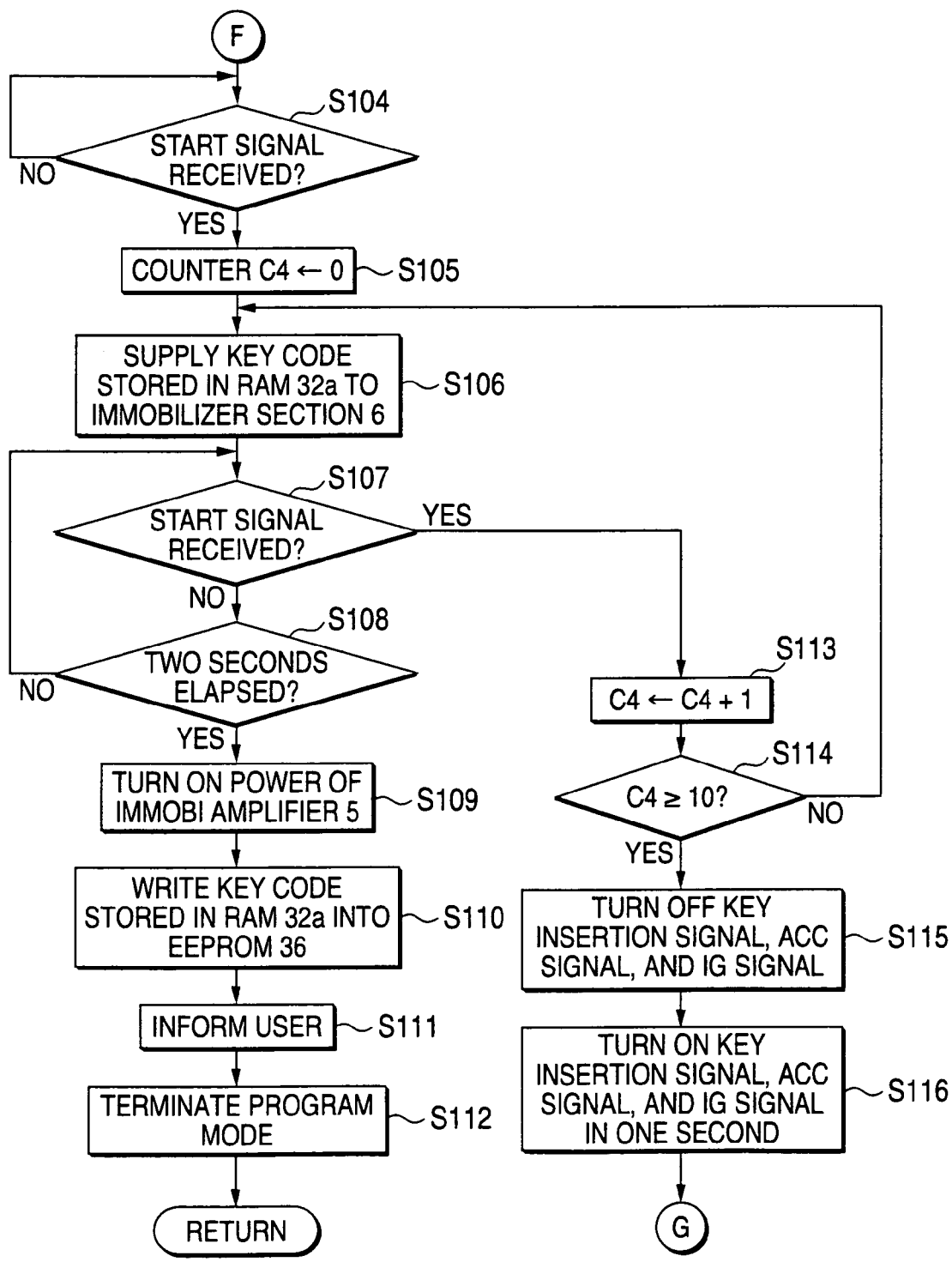
FIG. 8B is a flowchart to show processing operation (program processing) executed by the microcomputer in the remote starting control apparatus according to the fourth embodiment of the invention.

Next, whether or not the start signal supplied from the immobilizer section 6 is received is determined (step S104 in FIG. 8B). If it is determined that the start signal is not received, the process returns to step S104 and a wait is made for the start signal to be transmitted. On the other hand, if it is determined that the start signal is received, then a counter C4 is set to 0 (step S105) and the key code stored in the RAM 32a is transmitted together with a clock signal to the immobilizer section 6 via a signal line L2 (step S106). Then, whether or not the start signal transmitted from the immobilizer section 6 has been again received within a predetermined time (for example, two seconds) (steps S107 and S108).

Upon reception of the key code transmitted via the signal line L2, the immobilizer section 6 determines whether or not the received key code (here, the key code stored in the RAM 32a) matches the previously registered key code (key code collation). If the immobilizer section 6 determines that the key codes match (key code match), the immobilizer section 6 transmits an enable signal for enabling the engine to be started to the engine control section 7 and suppresses later transmitting the start signal, as described above. On the other hand, if the immobilizer section 6 determines that the received key code does not match the registered key code (key code mismatch), the immobilizer section 6 repeats transmission of the start signal (at a maximum of about 100 times every about 100 milliseconds).

Therefore, either of the following two cases a and b is possible as the case where the process proceeds to step S109 without again receiving the start signal within two seconds after transmission of the key code stored in the RAM 32a (after step S106):

a. the case where the key code stored in the RAM 32a matches the key code stored in the immobilizer section 6 and as the result of the key code collation in the immobilizer section 6, the key codes are determined to match and the enable signal is transmitted from the immobilizer section 6 to the engine control section 7; or b. the case where the key code stored in the RAM 32a does not match the key code stored in the immobilizer section 6 and thus transmission of the start signal from the immobilizer section 6 is repeated 100 times. However, if the number of the repetitions exceeds 10 at steps S113 and S114, the process does not proceed to steps S109 and proceeds to step S115, as described later in detail.

In contrast, the case where the start signal is again received within two seconds after transmission of the key code stored in the RAM 32*a* (after step S106) and the process proceeds to step S113 is:

c. the case where although the key code stored in the RAM 32*a* matches the key code stored in the immobilizer section 6, the key code is not determined to match in the immobilizer section 6 because of the effect of noise, etc.; or d. the case where the key code stored in the RAM 32*a* does not match the key code stored in the immobilizer section 6.

If it is determined at steps S107 and S108 that the start signal is not again received from the immobilizer section 6 within two seconds (the case a), it is assumed that the key code stored in the RAM 32*a* is the authorized key code. The switch 5*a* is opened for releasing shutoff of the power supply to the immobi amplifier 5 (step S109). Next, the key code stored in the RAM 32*a* is written into EEPROM 36 (step S110). To inform the user that the key code can be normally registered, a lamp lighting unit 38 is controlled for blinking a lamp (step S111) and then the program mode is released (step S112) and processing operation (4)-2 is terminated.

On the other hand, if it is determined at step S107 that the start signal is again received from the immobilizer section 6, namely, the key code matching the key code stored in the immobilizer section 6 is not received in the immobilizer section 6 (the case c, d), the counter C4 is incremented by one (step S113), and whether or not the counter C4 incremented by one is equal to or greater than a predetermined value (for example, 10) is determined (step S114).

If it is determined that the counter C4 is 10 or more (the case b), it is assumed that the key code stored in the RAM 32*a* is not the authorized key code. Then, a key insertion signal, an ACC signal, and an IG signal supplied to the immobilizer section 6 are turned off (step S115) and are turned on in a predetermined time (for example, one second) after the signals are turned off, whereby a state in which insertion operation of the ignition key 1 into the key cylinder 4 is performed is produced artificially (step S116). The process returns to step S31 (FIG. 8A) and registration processing is again performed from the beginning. On the other hand, if it is determined that the counter C4 is less than 10, the process returns to step S106 and the key code stored in the RAM 32*a* is again supplied to the immobilizer section 6.

According to the remote starting control apparatus according to the third or fourth embodiment, upon reception of a starting command of the engine by remote operation, the key code stored in the EEPROM 36 is supplied to the immobilizer section 6. Thus, if the key code matching the key code stored in the immobilizer section 6 is stored in the EEPROM 36, when a starting command of the engine by remote operation is received, the key code is supplied to the immobilizer section 6, which then enables the engine to be started as if the authorized ignition key 1 were inserted into the key cylinder 4.

Accordingly, if the authorized ignition key 1 is not inserted into the key cylinder 4 and not turned, the engine can be started by remote operation. As the engine, an engine of an internal combustion engine automobile, a power generator such as a motor of an electric automobile, or the like can be named.

Further, according to the remote starting control apparatus according to the third or fourth embodiment, the engine starting processing is performed using the key code as a candidate to be stored in the EEPROM 36 (key code stored in the RAM 32*a*), and whether or not the key code is the key code to be stored in the EEPROM 36 is checked. Therefore, the key code can be registered with good accuracy.

Figure 9:
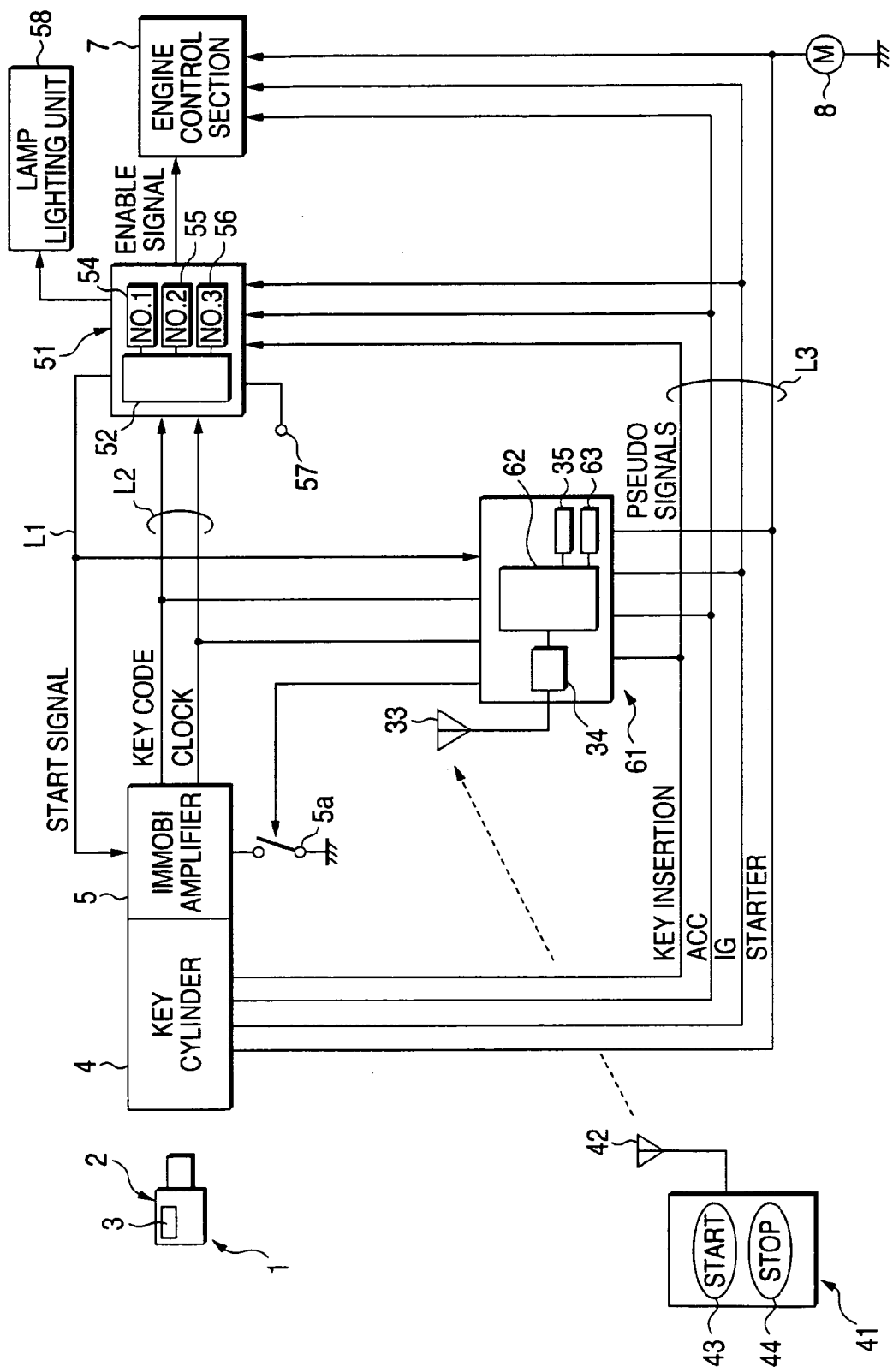
FIG. 9 is a block diagram to schematically show the main part of an engine starting system incorporating a starting control apparatus according to a fifth embodiment of the invention.

FIG. 9 is a block diagram to schematically show the main part of an engine starting system incorporating a starting control apparatus (immobilizer section) according to a fifth embodiment of the invention. Components similar to those of the engine starting system previously described with reference to FIG. 1 are denoted by the same reference numerals in FIG. 9.

The engine starting system includes an ignition key 1 a key cylinder 4, an immobi amplifier 5 attached to the key cylinder 4, an immobilizer section 51 having a theft prevention function, an engine control section 7 for performing control of engine starting, etc., a remote starting control apparatus 61, and a portable transmitter 41.

The immobilizer section 51 includes a microcomputer 52, EEPROM 54 to 56 in which a key code can be registered, and a program switch 57 to be used to set a program mode (mode for writing a key code into the EEPROM 54 to 56). Separate key codes can be registered in the EEPROM 54 to 56; here, three different key codes can be registered. A lamp lighting section 58 is connected to the immobilizer section 51 and can be controlled for lighting a lamp.

The remote starting control apparatus 61 includes a microcomputer 62, an antenna 33 and a reception unit 34 for receiving a signal transmitted from the portable transmitter 41, EEPROM 35 storing a remote ID code, and EEPROM 63 storing the key code unique to the remote starting control apparatus 61. The key code unique to the remote starting control apparatus 61 is previously registered by the manufacturer, etc.

The remote starting control apparatus 61 can control a switch 5*a* connected to the immobi amplifier 5, thereby shutting off power supply to the immobi amplifier 5.

The portable transmitter 41 includes a microcomputer (not shown), an antenna 42 for transmitting a predetermined signal to the remote starting control apparatus 61, EEPROM (not shown) storing a remote ID code, a button switch 43 for giving an engine starting instruction from a remote location, and a button switch 44 for giving an engine stop instruction.

When the button switch 43 is pressed, the microcomputer of the portable transmitter 41 transmits a signal including the remote ID code and the engine starting instruction code to the outside from the antenna 42. On the other hand, when the button switch 44 is pressed, the microcomputer transmits a signal including the remote ID code and the engine stop instruction code to the outside from the antenna 42.

Figure 10:
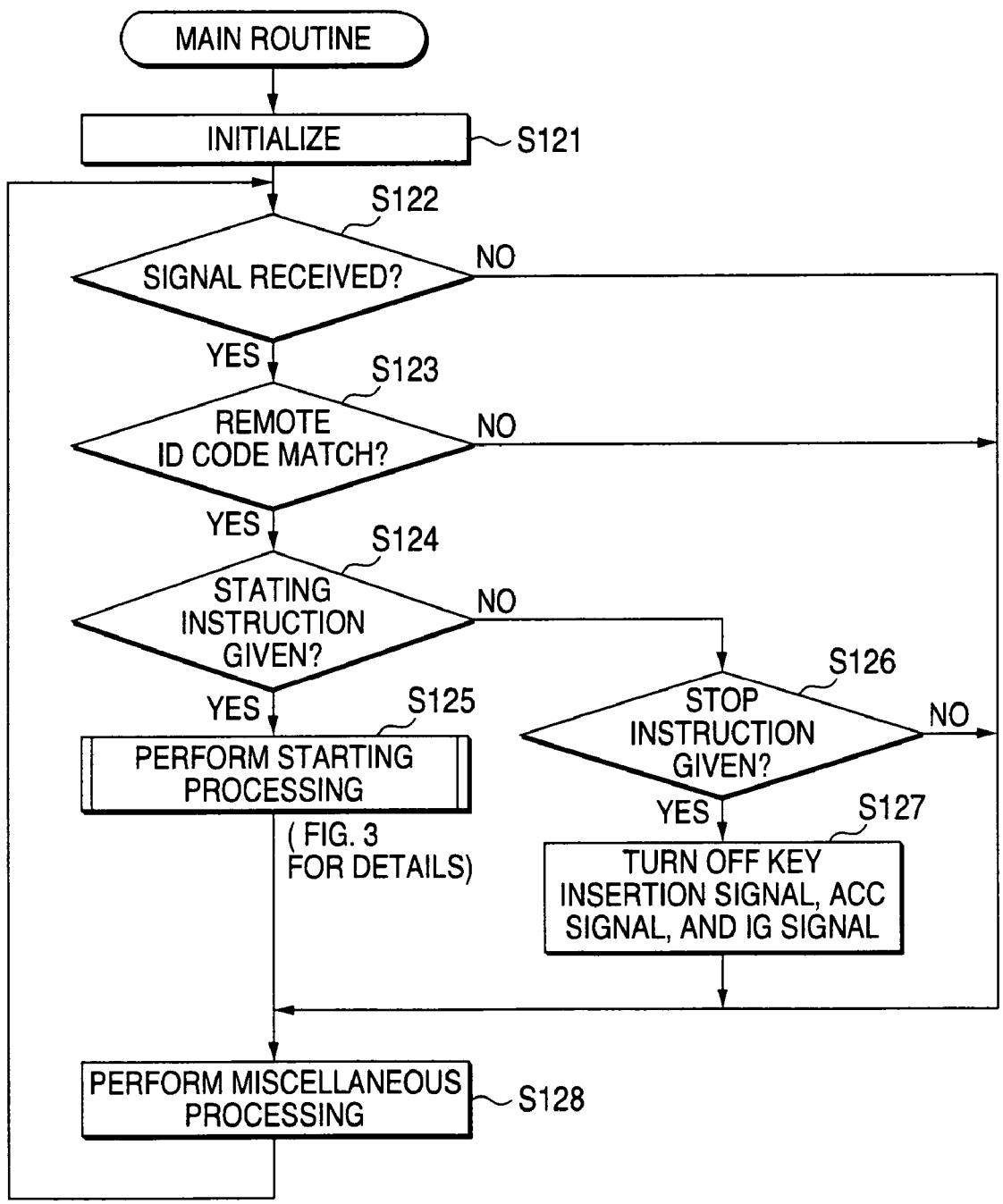
FIG. 10 is a flowchart to show processing operation (main routine) executed by a microcomputer in a remote starting control apparatus.

Next, processing operation (main routine) executed by the microcomputer 62 in the remote starting control apparatus 61 will be discussed based on a flowchart of FIG. 10. To begin with, initialization is executed for clearing a counter, etc., (step S121). Next, whether or not a signal is received through the antenna 33 and the reception unit 34 is determined (step S122). If it is determined that a signal is received, whether or not the ID code contained in the received signal matches the remote ID code stored in the EEPROM 35 (step S123).

If it is determined that the ID code contained in the received signal matches the remote ID code (namely, a signal transmitted from the portable transmitter 41 carried by the authorized driver is received), then whether or not the signal contains an engine starting instruction code is determined (step S124).

If it is determined that the signal contains an engine starting instruction code, the process proceeds to step S125 and engine starting processing is performed (see FIG. 3 for details) and then the process proceeds to step S128 and miscellaneous processing is performed. Then, the process returns to step S122.

On the other hand, if it is not determined that the signal contains an engine starting instruction code, then whether or not the signal contains an engine stop instruction code is determined (step S126). If it is determined that the signal contains an engine stop instruction code, engine stop processing is performed for turning off a key insertion signal, an ACC signal, and an IG signal to stop the engine (step S127) and then the process proceeds to step S8. If it is determined that the signal contains neither an engine starting instruction code nor an engine stop instruction code, the process proceeds to step S128.

If it is determined at step S122 that no signal is received or if it is determined at step S123 that although a signal is received, the signal is not a signal transmitted from the portable transmitter 41 carried by the authorized driver, processing for starting or stopping the engine or the like need not be performed and thus the process proceeds to step S128.

Figure 11:
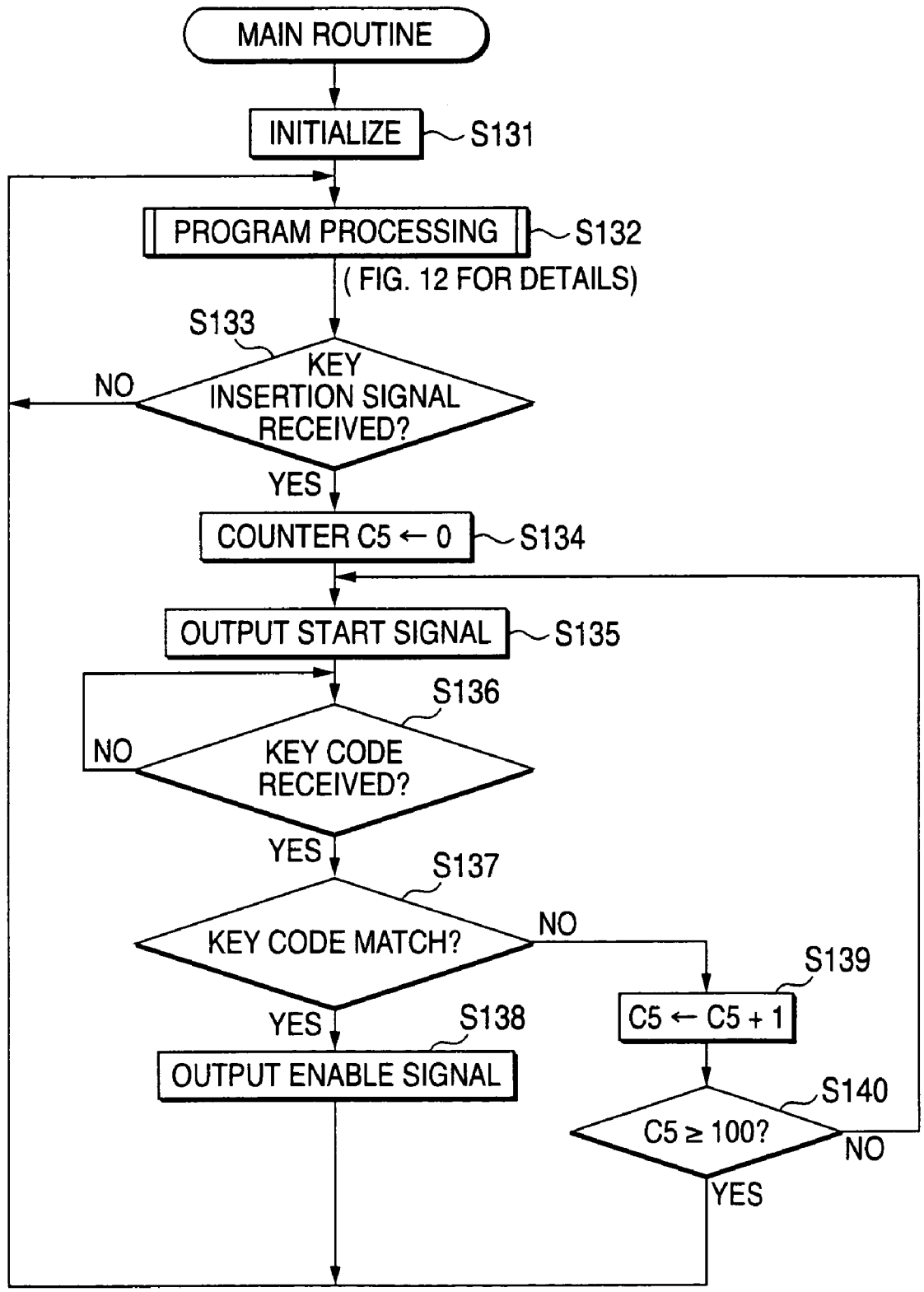
FIG. 11 is a flowchart to show processing operation (main routine) executed by the microcomputer in the starting control apparatus according to the fifth embodiment of the invention.

Next, processing operation (5) (main routine) executed by the microcomputer 52 in the starting control apparatus (immobilizer section 51) according to the fifth embodiment of the invention will be discussed based on a flowchart of FIG. 11. To begin with, initialization is executed for clearing a counter, etc., (step S131). Next, the process proceeds to step S132 and program processing is performed (see FIG. 12 for details). Then, whether or not a key insertion signal (low to high state transition) is received is determined (step S133).

The key insertion signal makes a low to high state transition when the ignition key 1 is inserted into the key cylinder 4 (case I) or when an engine starting command is given by remote operation as the button switch 43 of the portable transmitter 41 is pressed (case II).

If it is determined at step S133 that the key insertion signal is received, then a counter C5 is set to 0 (step S134) and a pulse-like start signal is supplied to a signal line L1 for transmitting the start signal to the immobi amplifier 5 and the remote starting control apparatus 61 (step S135). Then, a wait is made for a key code to be transmitted (step S136). On the other hand, if it is not determined that the key insertion signal is received, the process returns to step S132.

Case I

Upon reception of the start signal, the immobi amplifier 5 starts a transponder 3 of the ignition key 1 inserted in the key cylinder 4, thereby extracting the key code (unique to the ignition key 1) stored in the transponder 3, and outputs the extracted key code together with a clock signal to the immobilizer section 51 via a signal line L2.

Case II

Upon reception of the start signal, the remote starting control apparatus 61 outputs the key code unique to the remote starting control apparatus 61 stored in the EEPROM 63 together with a clock signal to the immobilizer section 51 via the signal line L2.

If it is determined at step S136 that the key code is received, then whether or not the received key code matches any of the key codes stored in the EEPROM 54 to 56 is determined (step S137). If it is determined that the key code matches any of the key codes, an enable signal for enabling the engine to be started is transmitted to the engine control section 7 (step S138).

On the other hand, if it is not determined at step S137 that the key code matches any of the key codes, the counter C5 is incremented by one (step S139), and whether or not the counter C5 incremented by one is equal to or greater than a predetermined value (for example, 100) is determined (step S140). If it is determined that the counter C5 is less than 100, the process returns to step S135 and the start signal is again transmitted. On the other hand, if it is determined that the counter C5 is equal to or greater than 100, the process returns to step S132.

Figure 12A:
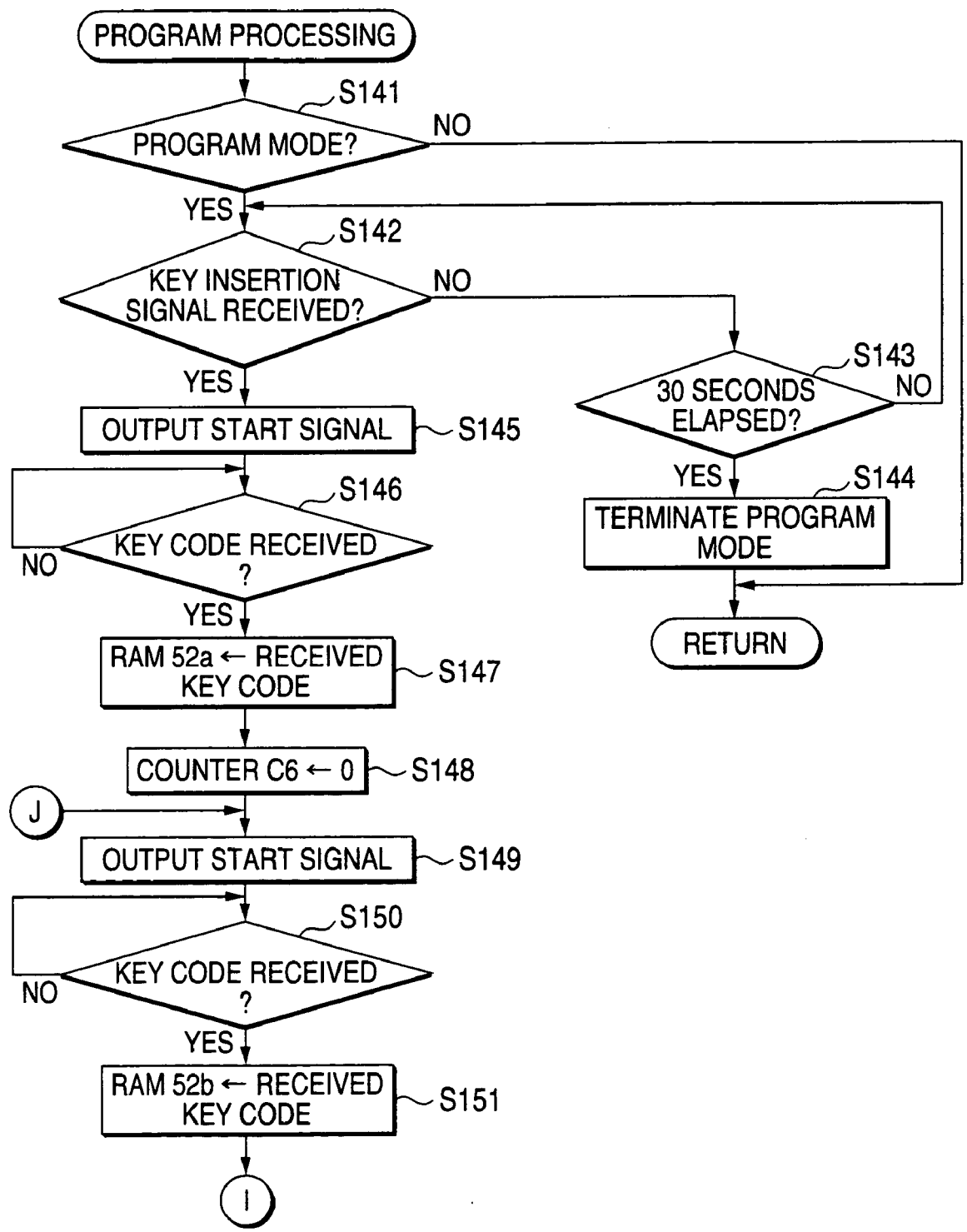
FIG. 12A is a flowchart to show processing operation (program processing) executed by the microcomputer in the starting control apparatus according to the fifth embodiment of the invention.
Figure 12B:
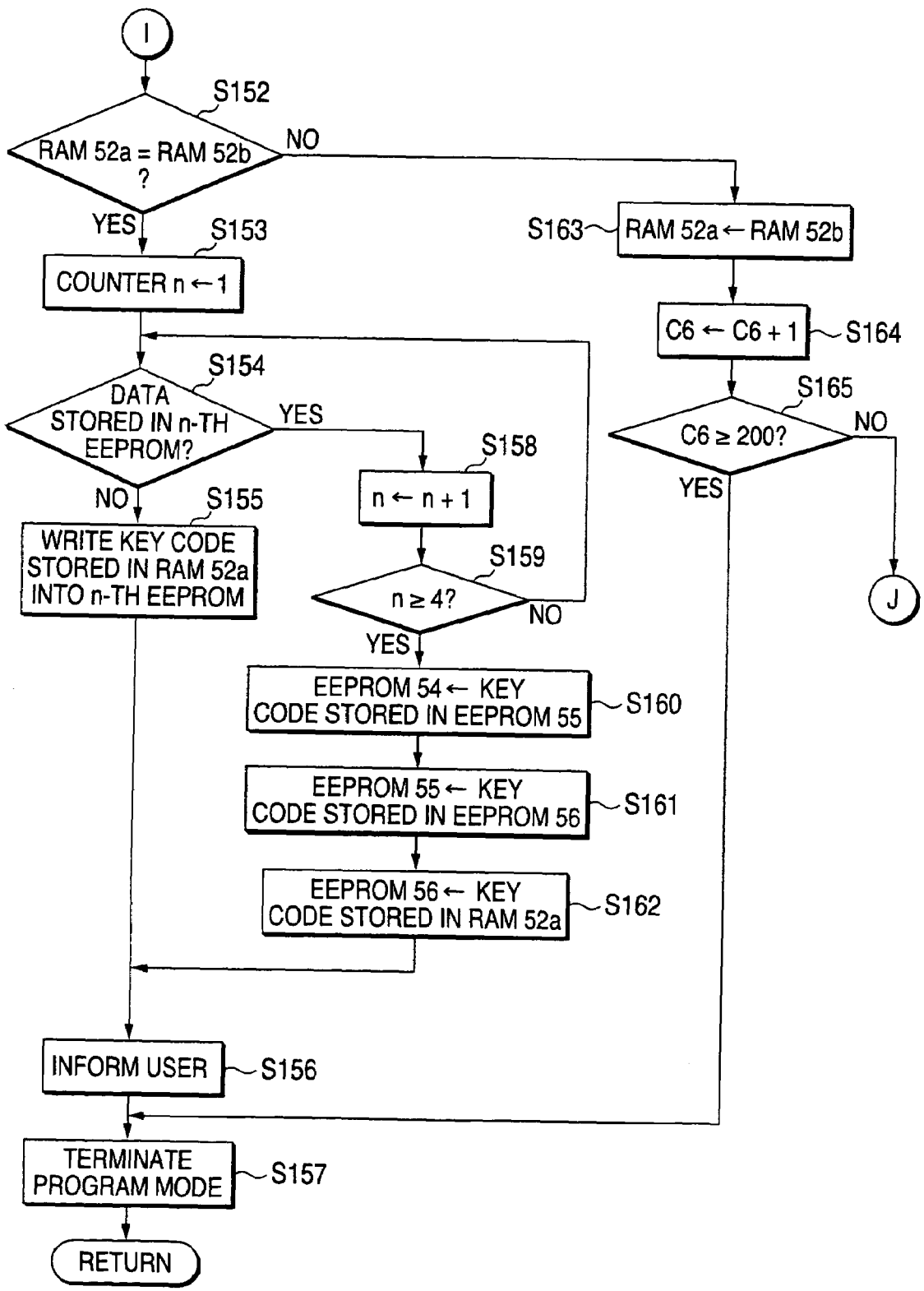
FIG. 12B is a flowchart to show processing operation (program processing) executed by the microcomputer in the starting control apparatus according to the fifth embodiment of the invention.
Figure 15:
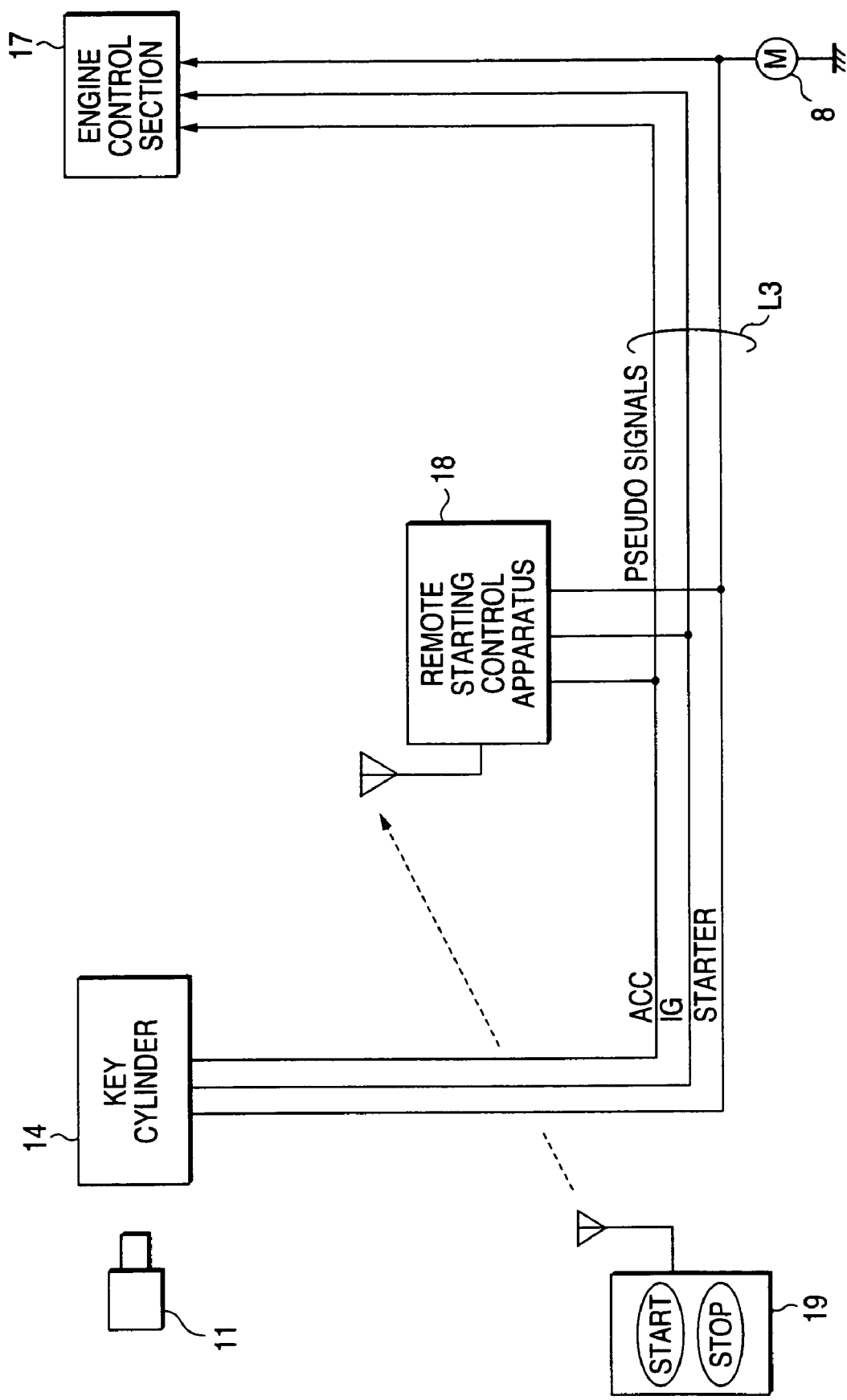
FIG. 15 is a block diagram to schematically show the main part of an engine starting system incorporating a remote starting control apparatus in a related art.

Next, processing operation (5)-1 (program processing at step S132 in FIG. 10) executed by the microcomputer 52 in the starting control apparatus (immobilizer section 51) according to the fifth embodiment will be discussed based on flowcharts of FIGS. 12A and 12B. Processing operation (5)-1 is operation for writing the key code registered in the transponder 3 of the ignition key 1 or the key code registered in the EEPROM 63 of the remote starting control apparatus 61 into the EEPROM 54 to 56. This write operation is accomplished when the program mode is set.

To begin with, whether or not the program mode is set is determined (step S141). If it is determined that the program mode is set, then the process proceeds to step S142 and processing for writing the key code into the EEPROM 54 to 56 is started. On the other hand, if it is not determined that the program mode is set, processing operation (5)-1 is terminated.

Here, as a program switch 37 is pressed, the program mode is set, but the program mode setting method is not limited to it. The program mode may be set, for example, as the ignition key 1 is inserted into the key cylinder 4 and a door is opened and closed repeatedly several times. In this case, however, a sensor for detecting the open or closed state of the door needs to be connected to the immobilizer section 51.

At steps S142 and S143, to check whether or not the ignition key 1 has been inserted into the key cylinder 4 or the button switch of the portable transmitter 41 has been pressed within a predetermined time (for example, 30 seconds), whether or not a key insertion signal (low to high state transition) is received within 30 seconds is determined.

The key insertion signal makes a low to high state transition when the ignition key 1 is inserted into the key cylinder 4 (case I) or when an engine starting command is given by remote operation as the button switch 43 of the portable transmitter 41 is pressed (case II), as described above.

If it is determined at steps S142 and S143 that a key insertion signal is not received within 30 seconds, it is assumed that the program mode is set by mistake, and the process proceeds to step S144. The program mode is released and then processing operation (5)-1 is terminated.

On the other hand, if it is determined at step S142 that a key insertion signal is received, namely, the ignition key 1 has been inserted into the key cylinder 4 or the button switch of the portable transmitter 41 has been pressed within 30 seconds, then a start signal is transmitted via the signal line L1 to the immobi amplifier 5 and the remote starting control apparatus 61 (step S145). Then, a wait is made for a key code to be transmitted (step S146).

Upon reception of the start signal, the immobi amplifier 5 starts the transponder 3 of the ignition key 1 inserted in the key cylinder 4, thereby extracting the key code (unique to the ignition key 1) stored in the transponder 3, and outputs the extracted key code to the immobilizer section 51, as described above.

On the other hand, upon reception of the start signal, the remote starting control apparatus 61 outputs the key code unique to the remote starting control apparatus 61 stored in the EEPROM 63 to the immobilizer section 51.

If it is determined at step S146 that the key code is received, the received key code is once stored in RAM 52a (not shown) in the microcomputer 52 (step S147) as comparison reference key code. Next, a counter C6 is set to 0 (step S148) and a start signal is transmitted via the signal line L1 to the immobi amplifier 5 and the remote starting control apparatus 61 (step S149). Then, a wait is made for a key code to be returned from the immobi amplifier 5 and the remote starting control apparatus 61 receiving the start signal (step S150).

If it is determined at step S150 that the key code is received, the received key code is once stored in RAM 52*b* (not shown) in the microcomputer 52 (step S151). Next, whether or not the comparison reference key code stored in the RAM 52*a* and the key code stored in the RAM 52*b* match is determined (step S152 in FIG. 12B).

If it is determined at step S152 that the key codes match, it is assumed that the key code unique to the ignition key 1 or the key code unique to the remote starting control apparatus 61 can be received normally. Next, a counter n is set to 1 (step S153) and whether or not data is already registered in the nth EEPROM is determined (step S154). Here, the first EEPROM is the EEPROM 54, the second EEPROM is the EEPROM 55, and the third EEPROM is the EEPROM 56.

If it is not determined that data is already registered in the nth EEPROM, then the key code stored in the RAM 52*a* is written into the nth EEPROM (step S155). To inform the user that the key code can be normally registered, the lamp lighting unit 58 is controlled for blinking the lamp (step S156) and then the program mode is released (step S157) and processing operation (5)-1 is terminated.

On the other hand, if it is determined that data is already registered in the nth EEPROM, then the counter n is incremented by one (step S158), and whether or not the counter n incremented by one is equal to or greater than a predetermined value (here, 4) is determined (step S159). If it is determined that the counter n is 4 or more, namely, data is already registered in all the EEPROM 54 to 56, first the data (key code) stored in the EEPROM 55 is written into the EEPROM 54 (step S160), next the data (key code) stored in the EEPROM 56 is written into the EEPROM 55 (step S161) and then the key code stored in the RAM 52*a* is written into the EEPROM 56 (step S162).

Next, the process proceeds to step S156 and to inform the user that the key code can be normally registered, the lamp lighting unit 58 is controlled for blinking the lamp and then the program mode is released (step S157) and processing operation (5)-1 is terminated. On the other hand, if it is determined at step S159 that the counter n is less than 4, the process returns to step S154.

If it is not determined at step S152 that the key codes match, the key code stored in the RAM 52*b* is stored in the RAM 52*a* as a new comparison reference key code (step S163). Next, the counter C6 is incremented by one (step S164) and whether or not the counter C6 incremented by one is equal to or greater than a predetermined value (for example, 200) is determined (step S165).

If it is determined that the counter C6 is 200 or more, it is assumed that whether or not the key codes match cannot be determined for some reason, and the program mode is released (step S157) and processing operation (5)-1 is terminated. On the other hand, if it is determined that the counter C6 is less than 200, the process returns to step S149 (FIG. 12A) and the start signal is again supplied to the signal line L1, thereby transmitting the start signal to the immobi amplifier 5 and the remote starting control apparatus 61.

According to the starting control apparatus according to the fifth embodiment, if the same key code is acquired two successive times, the key code is stored in any of the EEPROM 54 to 56. Therefore, the key code that can be normally input without receiving the effect of noise, etc., is stored in the EEPROM 54 to 56, so that the key code is registered with good accuracy.

Not only the key code unique to the ignition key 1, but also the key code unique to the remote starting control apparatus 61 can be registered.

In the starting control apparatus according to the fifth embodiment, if the same key code is acquired two successive times, the key code is stored in the EEPROM 54 to 56. The successive number of times is not limited to two and may be three or more. In a starting control apparatus according to a different embodiment, if the same key code is acquired twice or more unsuccessively, the key code may be stored in the EEPROM 54 to 56.

In the starting control apparatus according to the fifth embodiment, the storage locations to register the key code unique to the ignition key 1 and the key code unique to the remote starting control apparatus 61 are not distinguished from each other. However, in a different embodiment, the storage locations may be distinguished, for example, in such a manner that the key code unique to the ignition key 1 is registered in the EEPROM 54, 55 and the key code unique to the remote starting control apparatus 61 is registered in the EEPROM 56.

To do this, a method of providing two program modes and changing the storage location to register the key code depending on either of the modes can be used. For example, if the program switch 57 is pressed two successive times, the mode for registering the key code in the EEPROM 54, 55 is applied; if the program switch 57 is pressed long, the mode for registering the key code in the EEPROM 56 is applied.

In a starting control apparatus according to a different embodiment, the key code unique to the master key may be previously registered in EEPROM 54 by the manufacturer, etc., and it may be made impossible to register the key code unique to the subkey or the key code unique to the remote starting control apparatus 61 in the EEPROM 54. To set the program mode, if insertion of the master key into the key cylinder 4 is added to conditions, the security can be enhanced.

In the description of the engine starting systems incorporating the remote starting control apparatus according to the first to fourth embodiments and the starting control apparatus (immobilizer section) according to the fifth embodiment, the immobilizer section 6, 51 and the engine control section 7 are separate, but may be formed in one piece.

The remote operation can be applied not only to engine starting/stopping, but also to door locking/unlocking and warning mode setting/releasing to take precautions against vehicle theft, for example, if a vehicle is the target; in a remote starting control apparatus according to a different embodiment, such control functions other than engine starting/stopping (door locking/unlocking, warning mode setting/releasing, etc.,) may be added. That is, the remote starting control apparatus 31, 31A to 31C, 61, a vehicle-installed main unit of a keyless entry system, and/or a security system may be formed in one piece.

What is claimed is:

1. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:
- a first storage unit for storing a key code;
- a supply unit for supplying the key code stored in the first storage unit to the starting control apparatus upon reception of a starting command of the engine by remote operation;
- a first acquisition unit for acquiring the key code output from the key code output unit in response to a key code output request;
- a first determination unit for comparing two or more key codes output from the key code output unit in response to two or more key code output requests, acquired by the first acquisition unit, thereby determining the key code to be stored in the first storage unit from among the key codes;
- a first storage control unit for storing the key code determined by the first determination unit in the first storage; and
- a pseudo state producing unit for artificially producing a state in which the predetermined operation is performed.

2. The remote starting control apparatus according to claim 1, wherein
the first determination unit uses any of the key codes acquired by the first acquisition unit as the reference and determines whether or not the reference key code matches a different key code acquired by the first acquisition unit and if the reference key code matches the different key code, determines that either of the key codes is the key code to be stored in the first storage unit.

3. The remote starting control apparatus according to claim 1, further comprising:
a first request unit for sending a key code output request to the key code output unit, wherein
the key code output from the key code output unit in response to the key code output request made by the first request unit and acquired by the first acquisition unit is contained in the key code to be compared.

4. The remote starting control apparatus according to claim 1, further composing:
an informing unit, upon completion of storing the key code determined by the first determination unit in the first storage unit, for informing the user that the key code has been stored in the first storage unit.

5. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:
- a first storage unit for storing a key code;
- a supply unit for supplying the key code stored in the first storage unit to the starting control apparatus upon reception of a starting command of the engine by remote operation;
- a first acquisition unit for acquiring the key code output from the key code output unit in response to a key code output request;
- a first determination unit for comparing two or more key codes output from the key code output unit in response to two or more key code output requests, acquired by the first acquisition unit, thereby determining the key code to be stored in the first storage unit from among the key codes;
- a first storage control unit for storing the key code determined by the first determination unit in the first storage unit;
- a first request unit for sending a key code output request to the key code output unit, wherein
the key code output from the key code output unit in response to the key code output request made by the first request unit and acquired by the first acquisition unit is contained in the key code to be compared;
- a requirement determination unit for determining whether or not the $(n_1+1)$st key code to be compared needs to be acquired after the $n_1$ ($\geq 2$)th key code to be compared is acquired by the first acquisition unit; and
- a first execution control unit for causing a first request unit to make a key code output request if the requirement determination unit determines that the $(n_1+1)$st key code to be compared needs to be acquired.

6. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:
- a first storage unit for storing a key code;
- a supply unit for supplying the key code stored in the first storage unit to the starting control apparatus upon reception of a starting command of the engine by remote operation;
- a first acquisition unit for acquiring the key code output from the key code output unit in response to a key code output request;
- a first determination unit for comparing two or more key codes output from the key code output unit in response to two or more key code output requests, acquired by the first acquisition unit, thereby determining the key code to be stored in the first storage unit from among the key codes;
- a first storage control unit for storing the key code determined by the first determination unit in the first storage unit;
- a first request unit for sending a key code output request to the key code output unit, wherein
the key code output from the key code output unit in response to the key code output request made by the first request unit and acquired by the first acquisition unit is contained in the key code to be compared; and
- an input determination unit for determining whether or not the key code matching the predetermined key code is input in the starting control apparatus, wherein
the key code output from the key code output unit in response to the key code output request made by the starting control apparatus based on the predetermined operation and acquired by the first acquisition unit is contained in the key code to be compared.

7. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:

a first storage unit for storing a key code;

a supply unit for supplying the key code stored in the first storage unit to the starting control apparatus upon reception of a starting command of the engine by remote operation;

a first acquisition unit for acquiring the key code output from the key code output unit in response to a key code output request;

a first determination unit for comparing two or more key codes output from the key code output unit in response to two or more key code output requests, acquired by the first acquisition unit, thereby determining the key code to be stored in the first storage unit from among the key codes;

a first storage control unit for storing the key code determined by the first determination unit in the first storage unit;

a first request unit for sending a key code output request to the key code output unit, wherein the key code output from the key code output unit in response to the key code output request made by the first request unit and acquired by the first acquisition unit is contained in the key code to be compared;

an input determination unit for determining whether or not the key code matching the predetermined key code is input in the starting control apparatus, wherein the key code output from the key code output unit in response to the key code output request made by the starting control apparatus based on the predetermined operation and acquired by the first acquisition unit is contained in the key code to be compared; and a second execution control unit for causing a first request unit to make a key code output request if the input determination unit determines that the key code matching the predetermined key code is input in the starting control apparatus.

8. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:

a first storage unit for storing a key code;

a supply unit for supplying the key code stored in the first storage unit to the starting control apparatus upon reception of a starting command of the engine by remote operation;

a first acquisition unit for acquiring the key code output from the key code output unit in response to a key code output request;

a first determination unit for comparing two or more key codes output from the key code output unit in response to two or more key code output requests, acquired by the first acquisition unit, thereby determining the key code to be stored in the first storage unit from among the key codes;

a first storage control unit for storing the key code determined by the first determination unit in the first storage unit; and a pseudo state producing unit for artificially producing a state in which the predetermined operation is performed, wherein as the pseudo state producing unit artificially produces the state in which the predetermined operation is performed and the starting control apparatus sends a key code output request to the key code output unit, the key code output from the key code output unit and acquired by the first acquisition unit is contained in the key code to be compared.

9. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:

a first storage unit for storing a key code;

a supply unit for supplying the key code stored in the first storage unit to the starting control apparatus upon reception of a starting command of the engine by remote operation;

a first acquisition unit for acquiring the key code output from the key code output unit in response to a key code output request;

a first determination unit for comparing two or more key codes output from the key code output unit in response to two or more key code output requests, acquired by the first acquisition unit, thereby determining the key code to be stored in the first storage unit from among the key codes;

a first storage control unit for storing the key code determined by the first determination unit in the first storage unit;

a pseudo state producing unit for artificially producing a state in which the predetermined operation is performed, wherein as the pseudo state producing unit artificially produces the state in which the predetermined operation is performed and the starting control apparatus sends a key code output request to the key code output unit, the key code output from the key code output unit and acquired by the first acquisition unit is contained in the key code to be compared;

a requirement determination unit for determining whether or not the $(n_1+1)$st key code to be compared needs to be acquired after the $n_1$ ($\geq 2$)th key code to be compared is acquired by the first acquisition unit; and a third execution control unit for causing the pseudo state producing unit to perform processing if the requirement determination unit determines that the $(n_1+1)$st key code to be compared needs to be acquired.

10. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:

a first storage unit for storing a key code;

a supply unit for supplying the key code stored in the first storage unit to the starting control apparatus upon reception of a starting command of the engine by remote operation;

a first acquisition unit for acquiring the key code output from the key code output unit in response to a key code output request;

a first determination unit for comparing two or more key codes output from the key code output unit in response to two or more key code output requests, acquired by the first acquisition unit, thereby determining the key code to be stored in the first storage unit from among the key codes;

a first storage control unit for storing the key code determined by the first determination unit in the first storage unit;

a pseudo state producing unit for artificially producing a state in which the predetermined operation is performed, wherein as the pseudo state producing unit artificially produces the state in which the predetermined operation is performed and the starting control apparatus sends a key code output request to the key code output unit, the key code output from the key code output unit and acquired by the first acquisition unit is contained in the key code to be compared; and an input determination unit for determining whether or not the key code matching the predetermined key code is input in the starting control apparatus, wherein the key code output from the key code output unit in response to the key code output request made by the starting control apparatus based on the predetermined operation and acquired by the first acquisition unit is contained in the key code to be compared.

11. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising:

a first storage unit for storing a key code;

a supply unit for supplying the key code stored in the first storage unit to the starting control apparatus upon reception of a starting command of the engine by remote operation;

a first acquisition unit for acquiring the key code output from the key code output unit in response to a key code output request;

a first determination unit for comparing two or more key codes output from the key code output unit in response to two or more key code output requests, acquired by the first acquisition unit, thereby determining the key code to be stored in the first storage unit from among the key codes;

a first storage control unit for storing the key code determined by the first determination unit in the first storage unit;

a pseudo state producing unit for artificially producing a state in which the predetermined operation is performed, wherein as the pseudo state producing unit artificially produces the state in which the predetermined operation is performed and the starting control apparatus sends a key code output request to the key code output unit, the key code output from the key code output unit and acquired by the first acquisition unit is contained in the key code to be compared;

an input determination unit for determining whether or not the key code matching the predetermined key code is input in the starting control apparatus, wherein the key code output from the key code output unit in response to the key code output request made by the starting control apparatus based on the predetermined operation and acquired by the first acquisition unit is contained in the key code to be compared; and a fourth execution control unit for causing the pseudo state producing unit to perform processing if the input determination unit determines that the key code matching the predetermined key code is input in the starting control apparatus.

12. A remote starting control apparatus being installed in a vehicle incorporating a starting control apparatus for sending a key code output request to a key code output unit that can output a key code based on predetermined operation, inputting a key code output in response to the request, determining whether or not the input key code matches a predetermined key code, and if the key codes match, enabling an engine, etc., to be started, the remote starting control apparatus for performing starting control of the engine by remote operation, the remote starting control apparatus comprising;

a first storage unit for storing a key code;

a supply unit for supplying the key code stored in the first storage unit to the starting control apparatus upon reception of a starting command of the engine by remote operation;

a determination unit for determining the key code to be stored in the first storage unit from among the key codes provided by the key code output unit; and a check unit for supplying the key code determined by the determination unit to the starting control apparatus, thereby checking whether or not the key code is the key code to be stored in the first storage unit.

13. The remote starting control apparatus according to claim 12, wherein the check unit supplies the key code determined by the determination unit to the starting control apparatus and also issues a command to the engine, thereby checking whether or not the key code is the key code to be stored in the first storage unit.

14. The remote starting control apparatus according to claim 12, wherein the check unit checks whether or not the key code is the key code to be stored in the first storage unit based on the presence or absence of a key code output request from the starting control apparatus after supplying the key code determined by the determination unit to the starting control apparatus.

15. The remote starting control apparatus according to claim 12, further comprising:
a second storage control unit for storing the key code in the first storage unit if the check unit determines that the key code determined by the determination unit is the key code to be stored in the first storage unit.

16. A starting control apparatus comprising:
a storage unit for storing a key code;
a request unit for sending a key code output request to a key code output unit when a program mode to register a program mode in the storage unit is set;
an acquisition unit for acquiring the key code output from the key code output unit in response to the request made by the request unit;
a determination unit for comparing two or more key codes output from the key code output unit in response to two or more requests, acquired by the acquisition unit, thereby determining the key code to be stored in the storage unit from among the key codes;
a pseudo state producing unit for artificially producing a state in which a predetermined operation is performed; and
a storage control unit for storing the key code determined by the determination unit in the storage unit, wherein:
the key code output request is sent to the key code output unit for outputting the key code based on the predetermined operation,
the key code output is input in response to the request,
whether or not the input key code matches the key code stored in the storage unit is determined; and
if the key codes match, an engine to be started is enabled.

17. The starting control apparatus according to claim 16, wherein
the determination unit uses any of the key codes acquired by the acquisition unit as the reference and determines whether or not the reference key code matches a different key code acquired by the acquisition unit and if the reference key code matches the different key code, determines that either of the key codes is the key code to be stored in the storage unit.

18. A remote starting control apparatus being installed in a vehicle incorporating a starting control apparatus for performing starting control of an engine by remote operation, comprising:
a first storage unit for storing a key code;
a key code output unit;
a supply unit for supplying the key code stored in the first storage unit to the starting control apparatus upon reception of a starting command of the engine by remote operation;
a first acquisition unit for acquiring the key code output from the key code output unit in response to a key code output request;
a first determination unit for comparing two or more key codes output from the key code output unit in response to two or more key code output requests, acquired by the first acquisition unit, thereby determining the key code to be stored in the first storage unit from among the key codes;
a pseudo state producing unit for artificially producing a state in which a predetermined operation is performed; and
a first storage control unit for storing the key code determined by the first determination unit in the first storage unit, wherein:
the key code output request is sent to the key code output unit for outputting the key code based on the predetermined operation;
the key code output is input in response to the request;
whether or not the input key code matches a predetermined key code is determined; and
if the key codes match, the engine to be started is enabled.

19. A remote starting control apparatus being installed in a vehicle incorporating a starting control apparatus for performing starting control of an engine by remote operation, comprising:
a first storage unit for storing a key code;
a key code output unit;
a supply unit for supplying the key code stored in the first storage unit to the starting control apparatus upon reception of a starting command of the engine by remote operation;
a determination unit for determining the key code to be stored in the first storage unit from among the key codes provided by the key code output unit; and
a check unit for supplying the key code determined by the determination unit to the starting control apparatus, thereby checking whether or not the key code is the key code to be stored in the first storage unit, wherein
a key code output request is sent to the key code output unit for outputting the key code based on predetermined operation;
the key code output is input in response to the request;
whether or not the input key code matches a predetermined key code is determined; and
if the key codes match, the engine to be started is enabled.

* * * * *